United States Patent
Frank et al.

(10) Patent No.: US 7,261,672 B2
(45) Date of Patent: Aug. 28, 2007

(54) METHOD AND SYSTEM FOR CONTROLLING RATE OF CHANGE OF RATIO IN A CONTINUOUSLY VARIABLE TRANSMISSION

(75) Inventors: Andrew A. Frank, Davis, CA (US); Thomas Dreumont, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/804,814

(22) Filed: Mar. 19, 2004

(65) Prior Publication Data

US 2004/0254047 A1 Dec. 16, 2004

Related U.S. Application Data

(60) Provisional application No. 60/457,453, filed on Mar. 24, 2003, provisional application No. 60/456,226, filed on Mar. 19, 2003.

(51) Int. Cl.
*F16H 15/38* (2006.01)
*F16H 61/664* (2006.01)
*F16H 61/00* (2006.01)
*F16H 61/662* (2006.01)
*G06F 7/00* (2006.01)

(52) U.S. Cl. ............... 477/45; 477/50; 701/56
(58) Field of Classification Search ............ 477/37, 477/44–46, 50; 701/51, 55, 56
See application file for complete search history.

(56) References Cited

U.S. PATENT DOCUMENTS

| | | | | |
|---|---|---|---|---|
| 4,565,110 A | * | 1/1986 | Ito | 477/49 |
| 4,584,907 A | | 4/1986 | Niwa et al. | |
| 4,790,216 A | * | 12/1988 | Eggert et al. | 477/38 |
| 5,201,687 A | * | 4/1993 | Friedmann | 474/18 |
| 5,842,534 A | * | 12/1998 | Frank | 180/65.2 |
| 6,054,844 A | * | 4/2000 | Frank | 322/16 |
| 6,243,638 B1 | * | 6/2001 | Abo et al. | 701/51 |
| 6,459,978 B2 | | 10/2002 | Taniguchi et al. | |

FOREIGN PATENT DOCUMENTS

WO    WO 0120198 A1 *    3/2001

* cited by examiner

*Primary Examiner*—Tisha Lewis
(74) *Attorney, Agent, or Firm*—John P. O'Banion

(57) ABSTRACT

Systems and methods for efficiently and effectively controlling the rate of change of ratio, not simply the ratio, in a CVT. By controlling the rate of change of ratio, the acceleration or deceleration of a vehicle can be controlled in an efficient manner. Furthermore, the rate of change of ratio can be controlled by controlling the clamping pressure of the pulleys and/or differential pressure between the pulleys with minimal slip by using a servo control mechanism adapted for control by a system controller based on equilibrium mapping and other control parameters.

18 Claims, 27 Drawing Sheets

Data

| P1 (PSI) | P2 (PSI) | Ratio | Tcommand (Nm) | Tavailable (Nm) | In Speed (RPM) | Out Speed (RPM) | Out Torque (Nm) | Dyn Torque (Nm) | EM (%) |
|---|---|---|---|---|---|---|---|---|---|
| 126.4 | 206.2 | 2.365 | 53.6 | 139.6 | 1906.3 | 812.1 | 143.2 | 104.3 | 9.7 |
| 177.8 | 204.1 | 2.163 | 52.3 | 149.3 | 1712.9 | 805.8 | 130.3 | 94.6 | 9.7 |
| 183 | 208.2 | 2.02 | 52.1 | 161.7 | 1639.3 | 814.8 | 120.4 | 86.9 | 9.7 |
| 194.1 | 207.1 | 1.813 | 54.6 | 176.9 | 1442.7 | 806.7 | 106 | 76.6 | 9.7 |
| 201.3 | 206.4 | 1.613 | 52.2 | 195.1 | 1289.7 | 807.5 | 93.7 | 67.5 | 9.7 |
| 207.3 | 207.8 | 1.41 | 52.7 | 217.7 | 1140.6 | 808.4 | 81.6 | 58.6 | 9.7 |
| 216.4 | 207.9 | 1.21 | 54 | 246.5 | 972.1 | 803.8 | 68.6 | 49 | 9.7 |
| 228.9 | 211.6 | 1.01 | 53.3 | 287.4 | 817.9 | 803.3 | 56.3 | 40 | 9.7 |

Equilibrium point

| Calc Ratio | P1/P2 | Tq ratio |
|---|---|---|
| 2.347 | 0.613 | 0.320 |
| 2.126 | 0.871 | 0.292 |
| 2.012 | 0.879 | 0.269 |
| 1.788 | 0.937 | 0.257 |
| 1.597 | 0.975 | 0.223 |
| 1.411 | 0.998 | 0.202 |
| 1.209 | 1.041 | 0.183 |
| 1.018 | 1.082 | 0.155 |

*Calculated ratio* = Input speed / Output speed
*Pressure ratio* = Primary pressure / Secondary pressure
*Torque ratio* = Torque command / (Torque available * 1.2)

The torque available is multiplied by 1.2 because of the factor of safety used in the control algotithm

FIG. 23

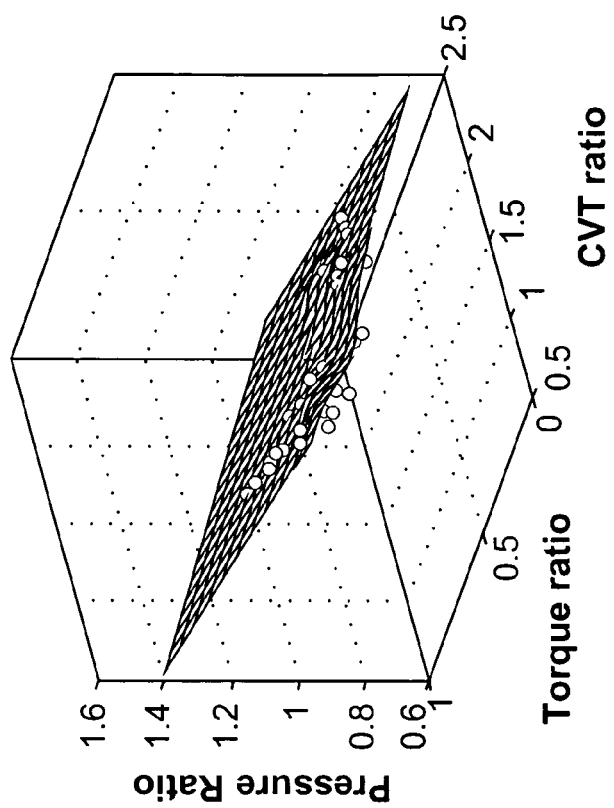
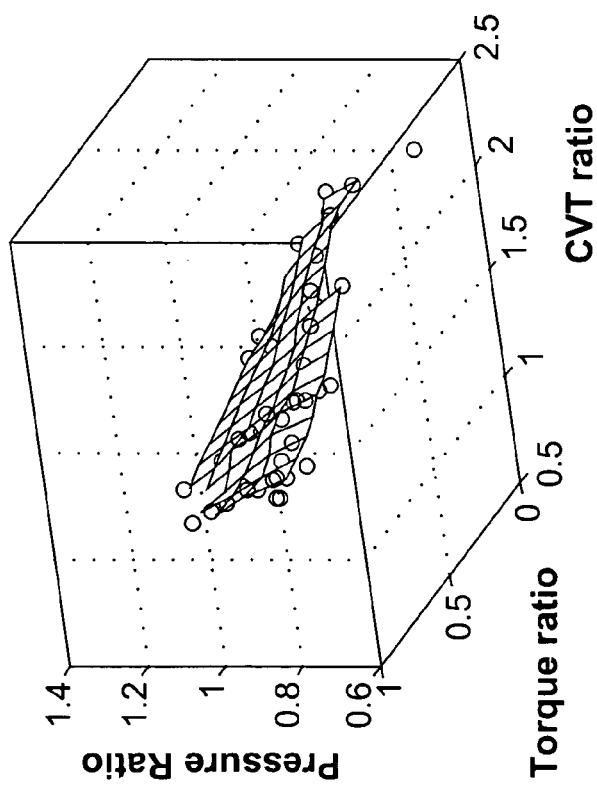
FIG. 26

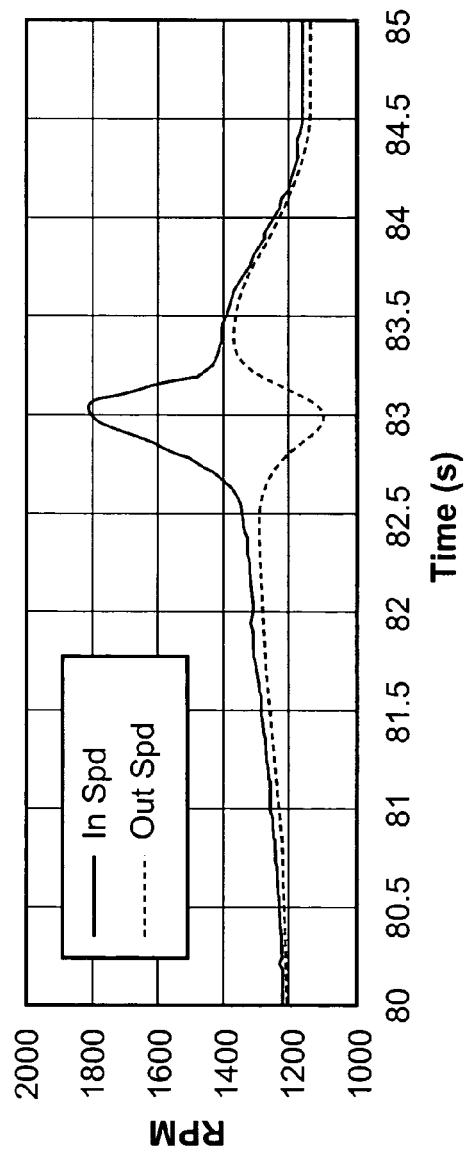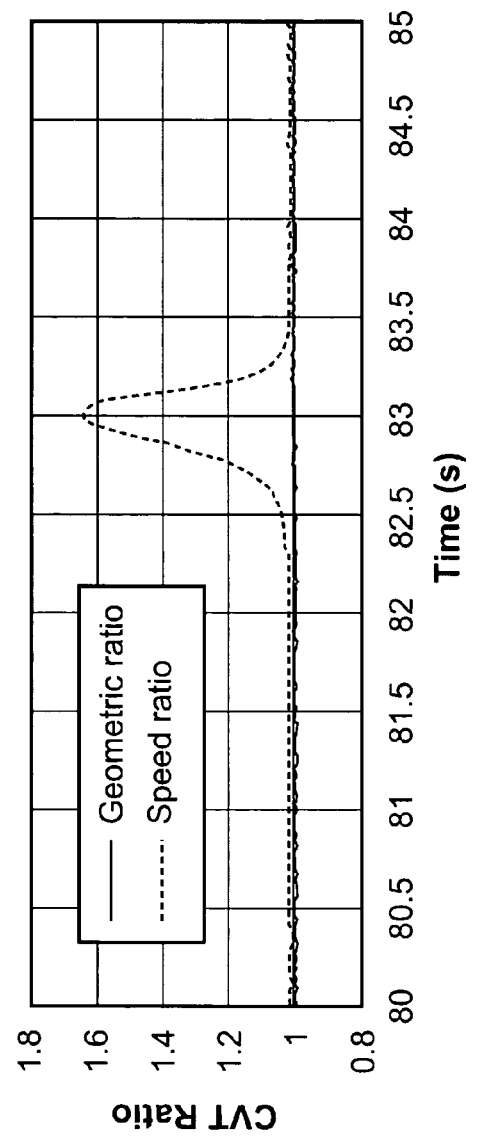
FIG. 30

METHOD AND SYSTEM FOR CONTROLLING RATE OF CHANGE OF RATIO IN A CONTINUOUSLY VARIABLE TRANSMISSION

CROSS-REFERENCE TO RELATED APPLICATIONS

This application claims priority from U.S. provisional application Ser. No. 60/456,226 filed on Mar. 19, 2003, incorporated herein by reference in its entirety.

This application also claims priority from U.S. provisional application Ser. No. 60/457,453 filed on Mar. 24, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to controlling the operation of a continuously variable transmission, and more particularly to a method and system for controlling, for example, the clamping and differential pressures in a continuously variable transmission to achieve a desired rate of change of ratio.

2. Description of Related Art

This application incorporates by reference U.S. Pat. No. 6,116,363, U.S. Pat. No. 6,054,844, U.S. Pat. No. 5,842,534, PCT International Publication No. WO 00/25417, PCT International Publication No. WO 02/058209 A1, and PCT International Publication No. WO 00/12918, each of which is related to this application.

The concept of an engine and a "continuously variable transmission" is a very old concept invented in the 1900's, but the theoretical efficiency of the engine, performance and drivability could never be obtained automatically. This can be seen with reference to the conventional powertrain and transmission shown in FIG. 1 where an internal combustion engine 10 has an output shaft 12 that drives a decoupling/starting clutch or torque converter 14, which is in turn coupled to the input shaft 16 of a continuously variable transmission (CVT) or automatic transmission (AT) 18, which in turn has an output driving a drive shaft or differential 20 coupled to a final drive wheel 22 (e.g., axle and tire). The deficiencies of such a configuration are caused by the dynamic equation representing the engine/CVT system:

$$\alpha_{DS} = \frac{-\mathring{R} I_E S_E + T_E R - T_{loss} - T_{RL}}{I_{DS} + R^2 I_E}, \mathring{R} = \frac{dR}{dt}$$

where $\alpha_{DS}$=acceleration of the vehicle reflected to the drive shaft, $$R = \frac{S_E}{S_{DS}},$$

$I_E$=engine inertia, $I_{DS}$=vehicle inertia at the driveshaft, $S_E$=engine speed, $S_{DS}$=drive shaft speed, $T_E$=engine torque, $T_{loss}$=torque losses, and $T_{RL}$=road load torque at the driveshaft. Because the first term $-\mathring{R} I_E S_E$ and the second term $T_E R$ generally oppose each other, the acceleration of the car and the torque and speed of the engine are difficult to control simultaneously. As a result, the best efficiency and minimum emissions for a gasoline or diesel engine cannot be realized without a sacrifice in performance. This can be seen with further reference to FIG. 2 and FIG. 3 which show operating characteristics of the engine as a function of engine speed and torque, where WOT=wide open throttle and denotes the maximum torque line, IOL=ideal torque/speed operating line and denotes where the best efficiency and/or least emissions (minimum brake specific fuel consumption or BSFC) occurs, and POL=practical operating line due to engine/transmission characteristics. Note in FIG. 3 that point A is less efficient than point B but must be used to provide proper vehicle behavior (transient performance).

As discussed in PCT International Publication No. WO 00/25417, the foregoing deficiencies can be overcome, for example, by inserting an electric motor or motor/generator, a battery, and associated controls between the engine and the continuously variable or automatic transmission. More particularly, a motor/generator is controlled to counteract the negative effect of the $-\mathring{R} I_E S_E$ in the dynamic equation. The motor/generator can then be used to allow the engine to operate at "wide open throttle" (WOT), or along the "Ideal Torque/Speed Operating Line" (IOL) for best efficiency and lowest emissions, or along any other predetermined operation line. In this way, the engine can be run continuously while energy flows into or out of the battery energy storage system connected to the electric motor/generator. If the battery is large enough to drive the vehicle a long distance, then the efficiency of energy into and out of the battery is high since the battery internal resistance is low. The emissions of the gasoline or diesel engine can be controlled effectively because the engine is operated at high load consistently. This approach ensures that the gasoline or diesel engine is never operated at closed throttle at high speeds or operated at low efficiency low load conditions. If the power required is lower than the minimum power of the engine on the IOL, the engine is automatically decoupled and stopped (or idled if desired), and the vehicle is operated as an electric vehicle.

More particularly, FIG. 4 shows an electric motor 24 coupled to the input shaft 16 of the continuously variable transmission 18 so that it injects power in parallel with the drive train between engine 10 and continuously variable transmission 18. Electric motor 24 is powered by a battery 26, which would typically comprise a bank of batteries, ultra-capacitors or the like, such as those used in electric vehicles. Operation of electric motor 24 is controlled by a motor controller 28, which is a conventional electronic armature controller or the like, which is in turn controlled by a microprocessor or other computer-based programmable system controller 30.

System controller 30 processes a plurality of control and feedback signals. As shown, the primary input control signals are from the vehicle accelerator pedal 32 and brake pedal 34. Based on these signals, system controller 30 sends a throttle control signal 36 to engine 10 to control the engine torque $T_E$, an engine engagement on/off signal 38 to clutch 14, a torque control signal 42 to motor controller 28 to control motor torque $T_M$, and a rate of change of speed ratio control signal 44 to control the rate of change $\mathring{R}$ of the speed ratio R of continuously variable transmission 18, where $$R = \frac{S_E}{S_{DS}}, S_E = \text{engine speed and } S_{DS} = \text{driveshaft speed.}$$

It should be noted that $$S_{DS} = S_{CAR} \times C$$

where $S_{CAR}$ is the speed of the vehicle and C is a constant dependent on the gear ratio of the final drive and tire radius for the vehicle. At the same time, system controller 30 senses engine speed $S_E$ via speed signals 40, the ratio R via signals 46, and vehicle speed $S_{CAR}$ via signals 48. Note that the system controller 30 may send an "on/off" signal to engine 10, but a separate starter motor is not needed; electric motor 24 can be used start engine 10 because it is coupled to engine output shaft 12 through clutch 14. The engine 10 may be turned "off" or idled when clutch 14 is opened.

Referring to FIG. 5, it will also be appreciated that the foregoing techniques can be extended to a series hybrid vehicle configuration as shown in which a generator 50 is used to provide charging capability for battery 26 as well as to provide a braking effect for engine 10 during deceleration. Operation of generator 50 is preferably controlled by a generator controller 52, which is a conventional electronic armature controller or the like. Generator controller 52 controls generator torque, $T_G$, in response to signals received from system controller 30 through torque control line 54. Note that $T_G = T_E$ in this configuration. Note also the inclusion of an optional starter control line 56 for starting and shutting down engine 10.

Note that operation of the engine in the above configuration is considerably different than in a series hybrid vehicle where the engine is always running at one speed. When the engine is operated at a constant speed, the efficient power output only occurs at one level. Thus the batteries will have to absorb excess power or provide additional power to drive the vehicle. This results in considerable deep battery cycling and attendant inefficiencies. In the systems shown in FIG. 4 and FIG. 5, the engine is used more and the batteries are shallow cycled. Because the amount of power cycled by the batteries is greatly reduced with the present invention, the range per battery charge is increased. Battery life is increased as well.

Referring now to FIG. 4, FIG. 6 and FIG. 7 together, system controller 30 implements the control and sensing functions of the system using conventional hardware and/or software. In FIG. 6, $A_C$=accelerator pedal position and represents power or torque commanded by the driver ($P_C$ or $+T_C$, respectively); $B_C$=brake pedal position representing negative torque commanded by the driver ($-T_C$); $T_M$=electric motor torque; $P_{EP}$=the error or difference between the power commanded by the driver and the power along the IOL for the power control mode ($P_C-P_{IOL}$); $T_{EP}$=the error or difference between the torque commanded by the driver and the torque along the IOL for the torque control mode $$\left(T_C - \frac{P_{IOL}}{S_E}\right);$$

$P_{IOLE}$=the power along the ideal operating line of the engine; $P_{IOLM}$=the power along the ideal operating line of the electric motor; IRL=the ideal regeneration line for braking; $T_{EB}$=the error or difference between the braking commanded by the driver and the braking along the IRL for the braking control mode ($B_C-T_{IRL}$); $T_{IRL}$=the torque along the ideal regeneration line for braking; $K_1$=a gain adjustment for desired response time and stability of the circuit, $K_2$=a gain adjustment set in response to $S_E\mathring{R}$ in order to achieve the desired response characteristics in FIG. 7, T=the time constant of the filter, S=the Laplace transform of variable $P_{EP}$ or $T_E$ which is easily programmed by those skilled in the art; R=the ratio between engine speed and driveshaft speed; $\mathring{R}$=the rate of change of ratio R; C=a conversion constant to convert vehicle speed to driveshaft speed; $S_E$=engine speed; $S_{DS}$=drive shaft speed; $S_{CAR}$=vehicle speed; and $K_B$ is a gain value for scaling. When the accelerator pedal is depressed, switches SW1 and SW2 go to the accelerator position. Switches SW3 and SW4 will be set according to whether the vehicle is in the electric or hybrid mode. Similarly, when the brake pedal is depressed, switches SW1 and SW2 go to the brake position. Each of these switches generally may be software switches in system controller 30. The $IOL_E$ of the engine is obtained by testing the engine to determine the best efficiency and emissions at each speed. The $IOL_M$ and IRL are obtained by testing the electric motor/generator and battery system to obtain the most energy into the battery at each speed. Note that the $IOL_M$ is used when the vehicle is in the electric drive mode where the vehicle is operated, generally, below freeway speeds until the batteries are depleted to a predetermined state as, for example, described in U.S. Pat. No. 5,842,534.

There are also many possible control algorithms for hybrid electric vehicles. The control objective in the above example is to drive the vehicle using electric energy until the internal combustion engine is turned "on" and then drive the vehicle with the internal combustion engine as much as electric energy when needed to maintain operation of the engine along the IOL. Significantly, energy may be put back into the batteries temporarily when the engine power is reduced in order to keep the engine on the IOL at all times in the hybrid mode. This kind of operation can significantly reduce emissions and increase engine efficiency.

In operation, system controller 30 senses the acceleration command $A_C$ from the accelerator pedal and the switches SW1 and SW2 shown in FIG. 6 go to the accelerator position. When power or a positive torque is commanded by the driver ($P_C$ or $+T_C$) in the electric vehicle mode determined by SW3 and SW4 as the case may be depending upon whether or not the system is operating in the power control region or the torque control region shown in FIG. 7, the system is in an acceleration mode and the desired motor torque $T_M$ is then determined at 114 according to $$T_M = \frac{P_C}{S_E} + K_2 S_E \mathring{R} \text{ or } T_M = T_C + K_2 S_E \mathring{R}$$

If the vehicle is in the hybrid-mode, then $T_M$ is determined at 126 according to $$T_M = \frac{P_C}{S_E} - T_{IOL_E} + K_2 S_E \mathring{R} \text{ or } T_M = T_C - T_{IOL_E} + K_2 S_E \mathring{R}$$

The motor torque signal determined above is sent to motor controller 28 in FIG. 4 to vary the speed and power of engine 10 and to drive the car. The resultant change in electric motor torque in turn affects the vehicle dynamics at 102, which affect engine speed, vehicle speed and the ratio R at CVT 18. Taking the speed of the vehicle $S_{CAR}$ as well as the ratio R at 102, in FIG. 6, engine speed $S_E$ (which may also be the same as the motor speed $S_M$ where they are on a common shaft) can be determined by applying a conversion constant C to the vehicle speed $S_{CAR}$ at 104 to get the speed $S_{DS}$ of driveshaft 20 of FIG. 4 (which is the output of CVT 18) and then multiplying the driveshaft speed $S_{DS}$ by the ratio R at 106 in FIG. 6 to give the engine speed $S_E$. Now having engine speed $S_E$, at 108, 116 and 128 look-up tables containing the IOL entries for the hybrid mode, braking mode and the electric mode, respectively, are accessed to determine the ideal engine power or torque output level for the given speed. Then, at 110 for the hybrid mode, 118 for the braking mode or 130 for the electric mode, the output of the corresponding look-up table is compared with either the power $P_C$ (if in power control mode) or positive torque $+T_C$ (if in torque control mode) commanded by the driver with the accelerator pedal as sensed from accelerator pedal position $A_C$ to determine a power error $P_{EP}$ or a torque error $T_{EP}$. The corresponding error signal is then used to affect the rate of change $\mathring{R}$ of the ratio R after filtering the signal at 112. CVT 18 of FIG. 4 thus responds in accordance with the adjustment of the rate of change of ratio, $\mathring{R}$.

Note that an important aspect of the control system is the control of the rate of change of the ratio R; that is, the control of $\mathring{R}$. This is accomplished by filtering the error signal between the commanded power PC or torque TC and the IOL power or torque. The signal filtering, which is in the form of $$K_1 \cdot \frac{1}{TS+1}$$

is well known in the art of electrical engineering. It is understood that this filter is only representative of one form that may be placed at this point, and in practice the filter may include both linear and non-linear elements. The purpose of the filter is to allow the designer to control the ratio rate, $\mathring{R}$.

It is undesirable to change R quickly and, therefore, a filter is necessary to provide the desired system response. The values of $K_1$ and T are heuristically determined, as is the form of the filter (which is shown here as first order). Those skilled in the art will appreciate that filters of many other representations will work and can be selected depending on the desired response.

During braking, torque is being commanded at the wheels rather than engine power. Here, system controller 30 senses the braking command $B_C$ from the brake pedal. When the driver commands negative torque $-T_C$, the system is in a deceleration (regeneration) mode and the switches go to the brake position. Here, control of the CVT and electric motor/generator reverses to produce a negative torque on the driveshaft, thus braking the vehicle. The operation of the braking circuit is similar to that of the accelerator circuit except for the use of the ideal regeneration line IRL, which reflects the highest efficiency for a given power for regenerating energy into the batteries by the electric motor/generator.

For purposes of braking, the desired motor torque $T_M$ is determined at 100 according to $$T_M = \frac{T_C}{R} - K_2 S_E \mathring{R}$$

and the signal is sent to motor/generator controller 28 to vary the speed and power of engine 10. The resultant change in electric motor/generator and engine torque again affect the vehicle dynamics at 102, to slow the car which affects motor and/or engine speed, vehicle deceleration and the ratio R at CVT 18. Here, however, engine speed $S_E$ is used at 116 to access a look-up table containing entries representing the IRL, which is also an empirically determined table. Then, at 118, the output of the look-up table is compared with the negative torque $-T_C$ commanded by the driver with the brake pedal as sensed from brake pedal position $B_C$ to determine the braking torque error $T_{EB}$. The braking torque error signal $T_{EB}$ is then scaled by a value of $K_B$ through gain box 120 and used to affect the rate of change $\mathring{R}$ of the ratio R after filtering at 112. It should be appreciated that the filtering in the brake torque control can be different if desired and that gain box 120 may contain additional filters.

As can be seen, therefore, FIG. 6 and FIG. 7 represent the controls for the configuration shown in FIG. 4 and, in principle, the controls for the configurations shown in FIG. 5 or other hybrid electric drive systems.

Consider typical operation shown in FIG. 7 in conjunction with the control diagram of FIG. 6. Assume that the vehicle is cruising at a fixed speed when the engine is supplying all the power to drive the vehicle and the electric motor/generator is supplying no power. Consider point A in FIG. 7 in this condition of steady state operation where $P_{EP}=0$ and $P_C=P_{IOL}$ is reached with the accelerator pedal position at $A_{CA}$. If the driver suddenly depresses the pedal to a second position, which will be designated as $A_{CB}$, meaning the driver wants to increase power, the torque increases instantly to point B along line $L_1$ with torque supplied by the electric motor and battery. This is so because $P_{EP}$ is now greater than $P_{IOL}$. Then $T_M$ is computed in block 114 if the vehicle is in the electric mode or block 126 if vehicle is in the hybrid mode. It will be appreciated that at this instant that $\mathring{R}=0$. Then $P_C/S_E$ supplies all necessary torque in electric mode and $P_C/S_E-T_{IOLE}$ or $T_C-T_{IOLE}$ supplies all of the torque if in the hybrid mode. This motor torque signal is transmitted to block 102. The power desired by the driver is then achieved instantly. If the accelerator pedal is held constant at this point over time, then the torque of the electric motor will decrease along a line of constant power along line $L_2$ in FIG. 7, thus holding the power constant as the vehicle accelerates. This line $L_2$ represents the action of the feedback loop as designed in FIG. 6 which includes blocks 102, 104, 106, 108 and 110 (or 128 and 130), and 114 or 126. The vehicle will continue to accelerate with motor torque decreasing along line $L_2$ until the point C is reached along the constant power line $L_2$. This point is reached when $P_{EP}$ is iteratively reduced to zero and $P_C = P_{IOL}$. It will be appreciated that at all times during this process, the engine always operates along the IOL.

The car then will maintain this speed until the position of accelerator pedal is again changed. If the accelerator pedal is now reduced to the original position, the net torque will be reduced to point D, and speed will proceed back to point A along a constant power line $L_4$. To accomplish this, the electric motor/generator must supply a negative torque to reach point D along line $L_3$. This happens instantly. As the net torque and power proceeds along line $L_4$, the electric motor/generator torque gradually approaches zero as the vehicle again begins to cruise when the accelerator position returns to $A_{C4}$. Note that the deceleration maneuver returns energy to the battery system described above, and the acceleration maneuver takes energy from the battery system while the engine continues to operate along the IOL.

It will be appreciated, therefore, that the throttle opening of the engine is set to provide the best efficiency for a given power along the IOL. The electric motor is used to force the engine to operate along the IOL and to provide correct transient response to the vehicle. Note that a large electric motor and a small engine is preferred, but the invention can also employ a large engine and small electric motor with slower response. The CVT provides the correct speed and power setting as quickly as dynamics and motor capacity allow. The battery capacity is then used to temporarily provide and absorb energy to allow the CVT to change ratio without detrimental effects on performance. It will further be appreciated that this is accomplished, in the preferred embodiment, by having the engine and the electric motor on the same shaft in the preferred embodiment.

Based on the foregoing, it will be appreciated that the electric motor can be used to supplement and control the gasoline or diesel engine during both acceleration and deceleration of the vehicle, thus allowing the engine to run at optimum efficiency across its entire speed band with generally a fixed throttle setting or in an un-throttled state so as to maximize engine efficiency. This is not possible in a conventional continuously variable transmission system as discussed in FIG. 1.

Now, consider braking the vehicle with a brake command $B_C$ in FIG. 6. As the brake pedal is depressed for a normal stop, switches SW1 and SW2 in FIG. 6 are set to the brake position. The braking level desired by the driver is compared with the ideal regeneration line (IRL) at block 118 at a given vehicle speed and transmission input speed $S_T$ or motor speed $S_M$. The IRL is a line determined by testing the motor/generator and battery system for the best efficiency for energy storage at each speed. After such testing procedure, an ideal line can be selected to connect all the best efficiency points yielding the IRL.

The brake command $B_C$ (at 34 in FIG. 6) represents a desired torque at the drive shaft or wheels of the car. At block 122 the torque command is divided by the ratio R to obtain the equivalent torque at the CVT input 124. This input is compared with the torque along the IRL at the speed of the motor $S_M$ at this instant. The error is used to command $\mathring{R}$ through the gain block 120 and filter block 112. The ratio R of the transmission will change to seek the IRL via the feedback control system of blocks 102, 104, 106, 112, 116, 118 and 120. It is understood that this control system becomes ineffective when the ratio reaches its physical limits Rmin or Rmax.

The desired torque at the output of block 122 is sent to block 100 to compute the motor torque necessary to achieve the desired braking torque at the driveshaft and consequently the wheels of the car. Initially the torque at the motor is $T_C/R$ since $\mathring{R}$ is zero at the start of the maneuver.

From the foregoing, it should be apparent that there is a need for systems and methods for efficiently and effectively controlling the rate of change of ratio $\mathring{R}$, not simply the ratio, in a CVT. Furthermore, because a CVT is a drivetrain component and various load conditions can cause the CVT to slip, various approaches have been taken to control CVT pressure and minimize slip. However, conventional control mechanisms are mechanically based, using valves, orifices, and the like, and are conservatively designed for high pressure conditions which leads to lower efficiency and durability. Accordingly, there is also a need for a pressure control mechanism and method that controls the pressure in a CVT to prevent slip under all driver input conditions.

BRIEF SUMMARY OF THE INVENTION

Accordingly, the present invention pertains to systems and methods for efficiently and effectively controlling the rate of change of ratio, not simply the ratio, in a CVT. By controlling the rate of change of ratio, the acceleration or deceleration of a vehicle can be controlled in an efficient manner. Furthermore, the rate of change of ratio can be controlled by controlling the clamping pressure of the pulleys and/or differential pressure between the pulleys with minimal slip.

The present invention recognizes that the overall behavior of a CVT is dependent upon a number of variables, such as clamping pressure, differential pressure between pulleys, oil temperature, input shaft speed, and torque. In view of those variables that affect CVT behavior, the present comprises systems and methods for mapping performance variables to an output value, such as differential pressure needed to achieve a desired rate of change of ratio.

By way of example, and not of limitation, the present invention comprises a computerized controller having programming that includes an algorithm, set of algorithms, map or set of maps, that relate input criteria such as existing ratio, torque, speed, and clamping pressure to the level of differential pressure needed to achieve a rate of change of ratio. Once a rate of change of ratio is selected, the clamping or differential pressure is controlled to achieve that rate of change of ratio.

By way of further example, the invention comprises a method and apparatus for providing for optimal control of the primary and secondary pressure of a CVT in order to achieve an ideal commanded clamping pressure due to the input torque command and the commanded rate of change of ratio (or shift velocity), by using previous knowledge of the operational characteristics of the CVT.

An aspect of the invention, therefore, is to control the clamping pressures of the primary and secondary pulleys in a CVT as necessary to achieve a desired rate of change of ratio.

Another aspect of the invention is to control the differential pressure in a CVT as necessary to achieve a desired rate of change of ratio.

Another aspect of the invention is to determine the differential pressure in a CVT that corresponds to a particular rate of change of ratio.

A further aspect of the invention is to map operational characteristics to a desired differential pressure in a CVT. Those characteristics include clamping pressure, speed, torque, current differential pressure, current ratio, oil temperature, etc.

Another aspect of the invention is an algorithm for determining differential pressure in a CVT for producing a desired rate of change of ratio.

Another aspect of the invention comprises empirical data which is used for the above-described mapping and algorithm.

Another aspect of the invention is to provide an apparatus for controlling the rate of change of ratio in a continuously variable transmission (CVT). In one embodiment, the apparatus comprises a controller and means associated with the controller for mapping at least one operational characteristic of the CVT to at least one control characteristic. The operational characteristic can, for example, comprise CVT clamping pressure, input shaft speed, torque, differential pressure between pulleys, ratio, and oil temperature.

Another aspect of the invention is to provide a hybrid electric vehicle with dynamic control of the rate of change of ratio in the CVT. In one embodiment, the vehicle comprises an internal combustion engine coupled to the CVT, an electric motor coupled to the output of the internal combustion engine, and a computerized system controller configured to operate said motor simultaneously with said engine and apply positive or negative motor torque to said engine output to maintain engine power output substantially along a predetermined operating line, wherein the controller is configured to control rate of change of ratio of said CVT using said means for mapping, and wherein the system controller controls the rate of change of ratio of the CVT and said motor torque to vary acceleration or deceleration of said vehicle.

Another aspect of the invention is to provide an apparatus for controlling the operation of a continuously variable transmission (CVT). In one embodiment, the apparatus comprises a programmable controller and programming associated with said controller for mapping at least one operational characteristic of the CVT to at least one control characteristic of the CVT. The operational characteristic can, for example, comprise CVT clamping pressure, input shaft speed, torque, differential pressure between pulleys, ratio, and oil temperature. In another embodiment, the apparatus comprises a controller and an algorithm or map associated with the controller, wherein the algorithm or map determines differential pressure level between pulleys in the CVT for achieving a desired rate of change in ratio in the CVT.

The invention also comprises a method and apparatus for controlling the operation of a continuously variable transmission (CVT) having two pairs of conical disks mutually coupled by a chain or belt as a power transmission element, in which at least one disk of each pair is coupled to a hydraulic actuator. By way of example, and not of limitation, in one embodiment the comprises two hydraulic pumps driven by two servomotors, and a control processor with programming for controlling both the primary and secondary pressures simultaneously. The invention is applicable to any CVT, which allows the control of the primary and secondary pressures by one way or another. The invention can also be used with CVTs where only one pressure is fully controllable.

Accordingly, another aspect of the invention is a method comprising controlling the primary and secondary pressure of a CVT to achieve an ideal commanded clamping pressure for the input torque command and commanded ratio rate or shift velocity based on a mapping of empirical data relating pressures, ratio rate, and torque input. In one embodiment, this is achieved by mapping the relationship between primary and secondary pressures of the CVT and rate of change of ratio to transmit a given amount of torque, and controlling the primary and second pressure of the CVT to achieve an optimized clamping pressure for commanded torque and ratio rate based on said mapping. In another embodiment, this is achieved by determining an equilibrium ratio map of a CVT to be controlled, determining a pressure relationship between the ratio rate of the CVT and the distance between the point corresponding to the current states of the CVT and the projection of this point onto said equilibrium ratio map, and using the equilibrium ratio map and said pressure relationship, controlling the primary and secondary pressures of the CVT to control the ratio rate and/or ratio and clamping pressure of the CVT.

Another aspect of the invention is an apparatus for optimizing the operation of a CVT. In one embodiment, the apparatus comprises a control computer and programming associated with the control computer for carrying out the operations of controlling the primary and secondary pressure of a CVT to achieve a ideal commanded clamping pressure due to the input torque command and commanded ratio rate or shift velocity based on a mapping of empirical data relating pressure, ratio rate, and torque. In another embodiment, the apparatus comprises a control computer and programming associated with said control computer for accessing a map of the relationship between pressure of a CVT and rate of change of ratio to transmit a given amount of torque, and for controlling the primary and second pressure of the CVT to achieve an optimized clamping pressure for commanded torque and ratio rate based on said map. In a still further embodiment, the apparatus comprises a control computer and programming associated with said control computer for carrying out the operations of controlling the primary and secondary pressures of the CVT to control the ratio rate and/or ratio and clamping pressure of the CVT based on an equilibrium ratio map of the CVT and the pressure relationship between the ratio rate of the CVT and the distance between the point corresponding to the current states of the CVT and the projection of this point onto the equilibrium ratio map.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 23 is a chart showing experimental equilibrium map data for a servo control mechanism according to the present invention.

FIG. 26 is a series of graphs showing an approximation of experimental data points into a plane.

FIG. 30 is a series of graphs illustrating macro slip.

DETAILED DESCRIPTION OF THE INVENTION

The present invention generally comprises a method and system for controlling the rate of change of ratio in a CVT. In the preferred embodiment, the invention employs an algorithm, set of algorithms, map or set of maps, that relate input criteria such as existing ratio, torque, speed, and clamping pressure to the level of differential pressure needed to achieve a rate of desired rate of change of ratio. In other words, once the desired rate of change of ratio is determined, this mapping can be used in conjunction with the dynamic equations for controlling rate of change of ratio to achieve the desired rate of change. The present invention also comprises a method and system for providing optimal control of the primary and secondary pressure of a continuously variable transmission (CVT), in order to achieve an ideal commanded clamping pressure due to the input torque command and the commanded rate of change of ratio (or shift velocity), by using previous knowledge of the operational characteristics of the CVT.

Figure 1:
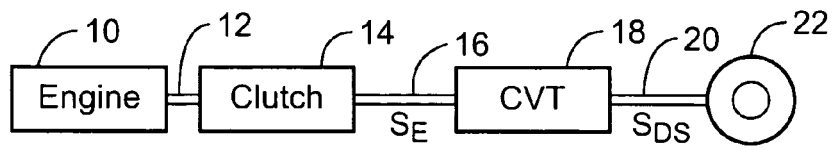
FIG. 1 is a functional block diagram of a conventional vehicle with a powertrain employing a continuously variable or multi-speed automatic transmission.
Figure 2:
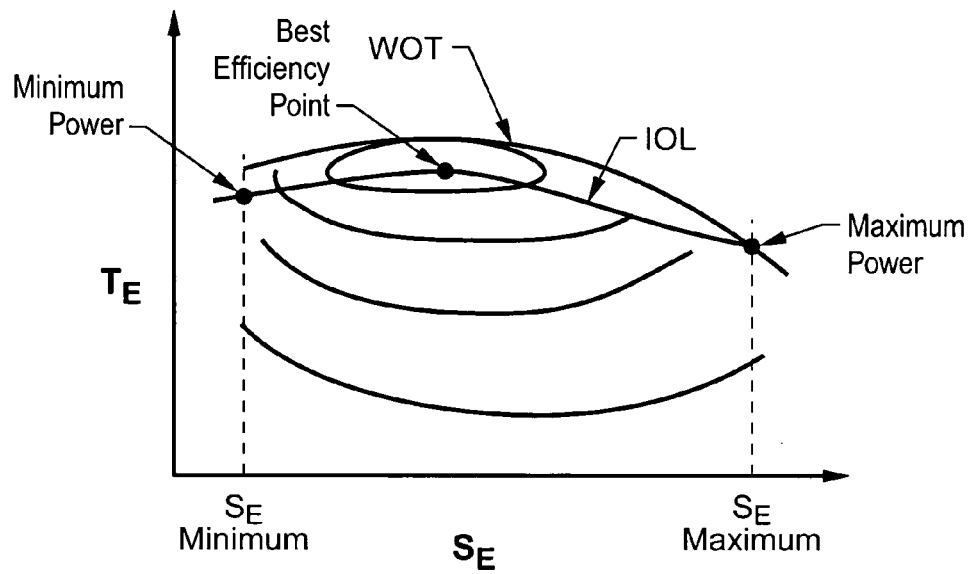
FIG. 2 is a graph showing the torque-speed efficiency map of a typical combustion engine showing maximum torque at wide open throttle (WOT) and an ideal operating line (IOL) which produces the best efficiency and minimum emissions for a given power of the engine shown in FIG. 1.
Figure 3:
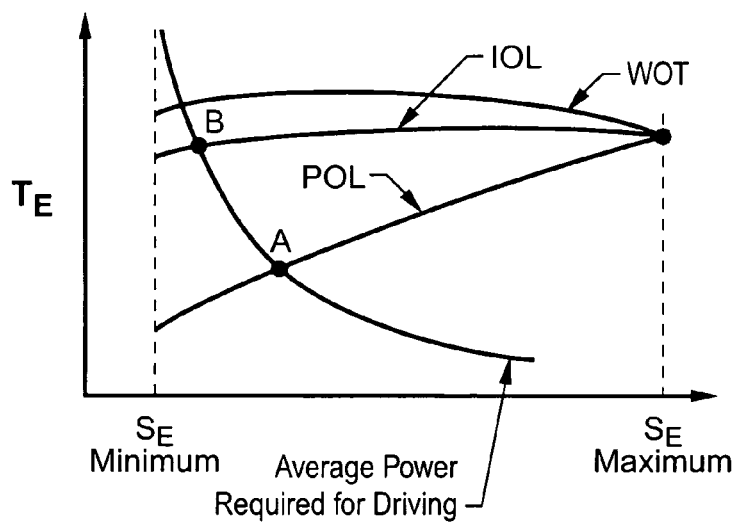
FIG. 3 is a graph showing the practical operating line (POL) required for the conventional vehicle shown in FIG. 1 compared with the ideal operating line (IOL).
Figure 4:
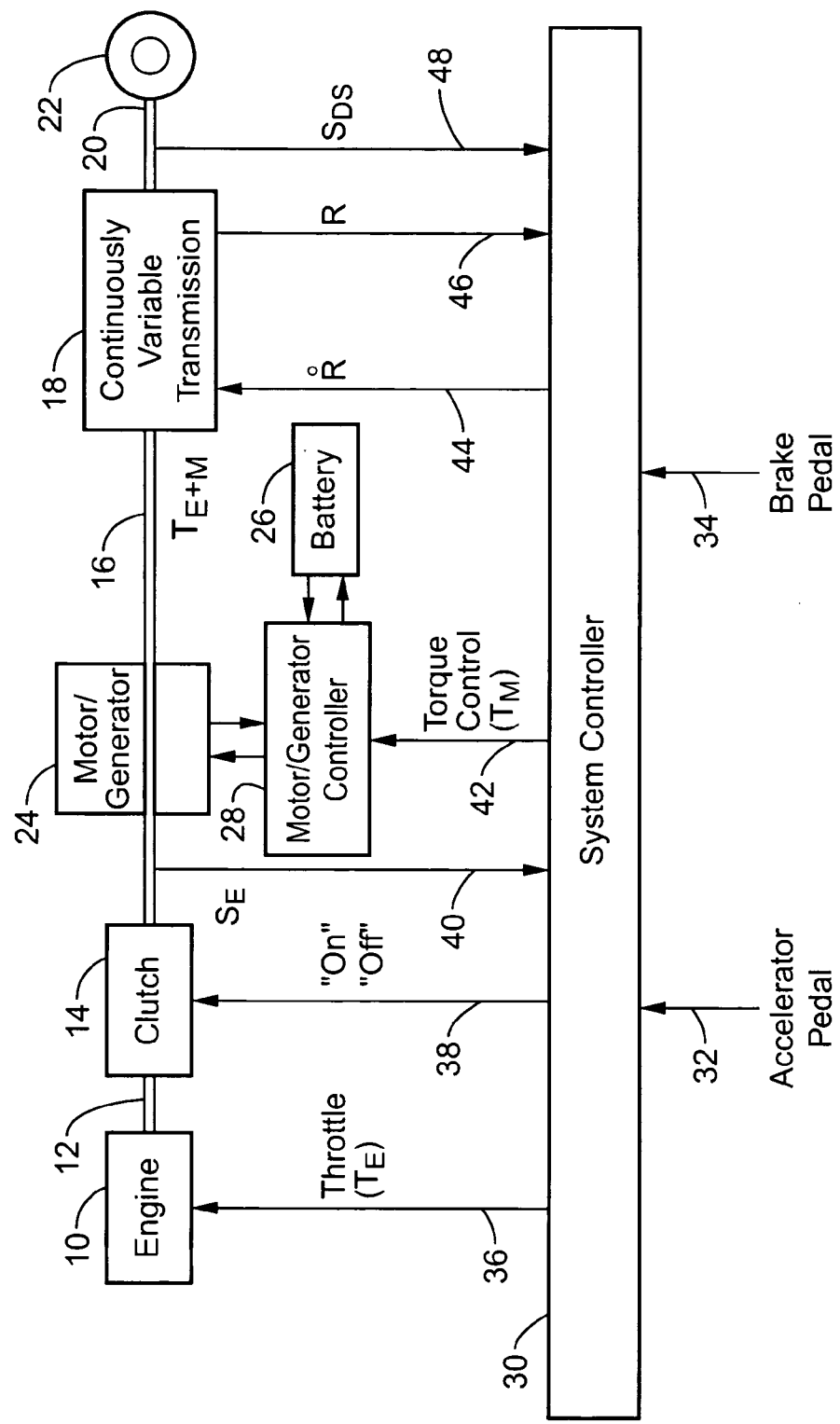
FIG. 4 is a functional block diagram of a control apparatus in a parallel hybrid configuration having a continuously variable transmission in the drive train.
Figure 5:
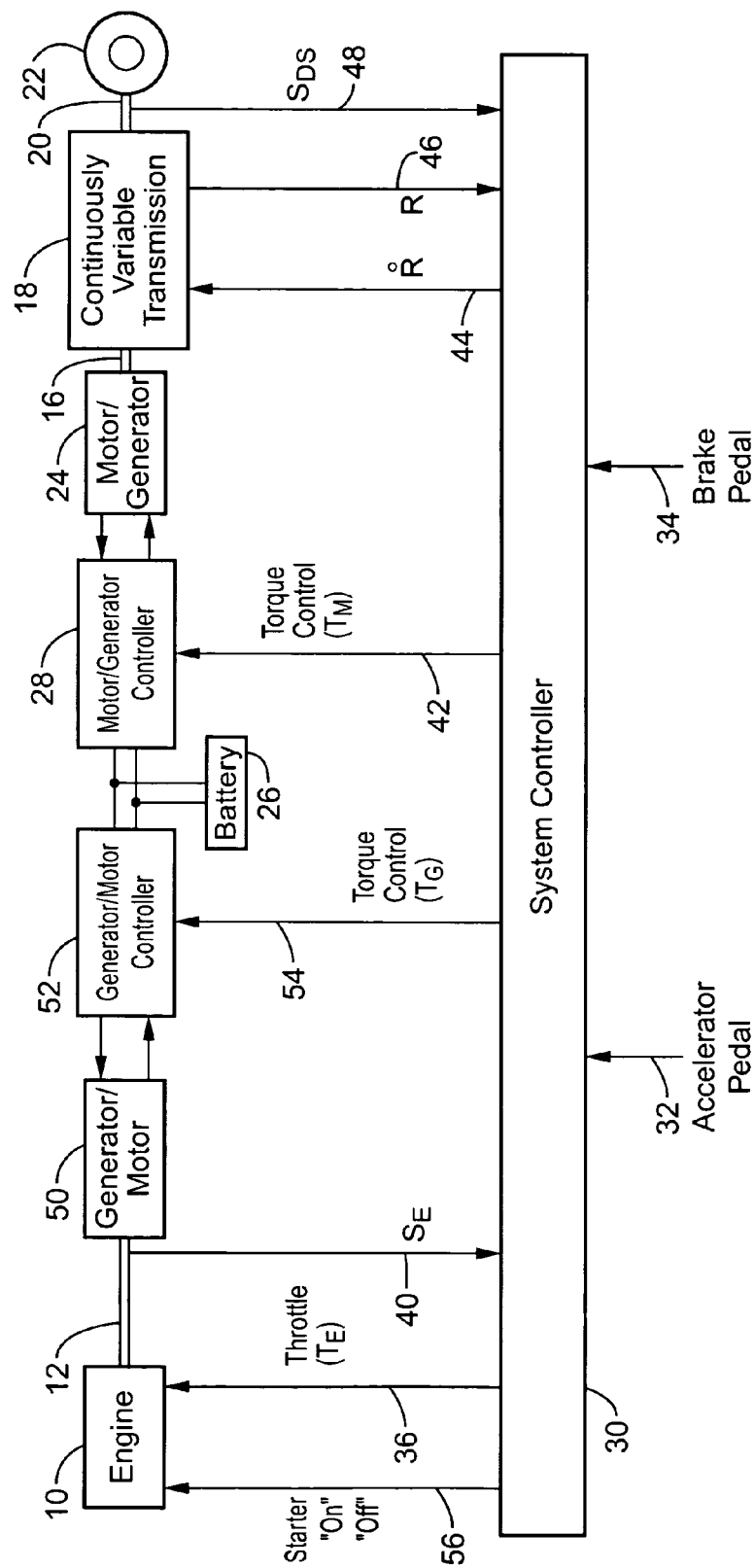
FIG. 5 is a functional block diagram of an alternative embodiment of the control apparatus shown in FIG. 4 in a series hybrid configuration having a continuously variable or automatic transmission in the drive train.
Figure 6:
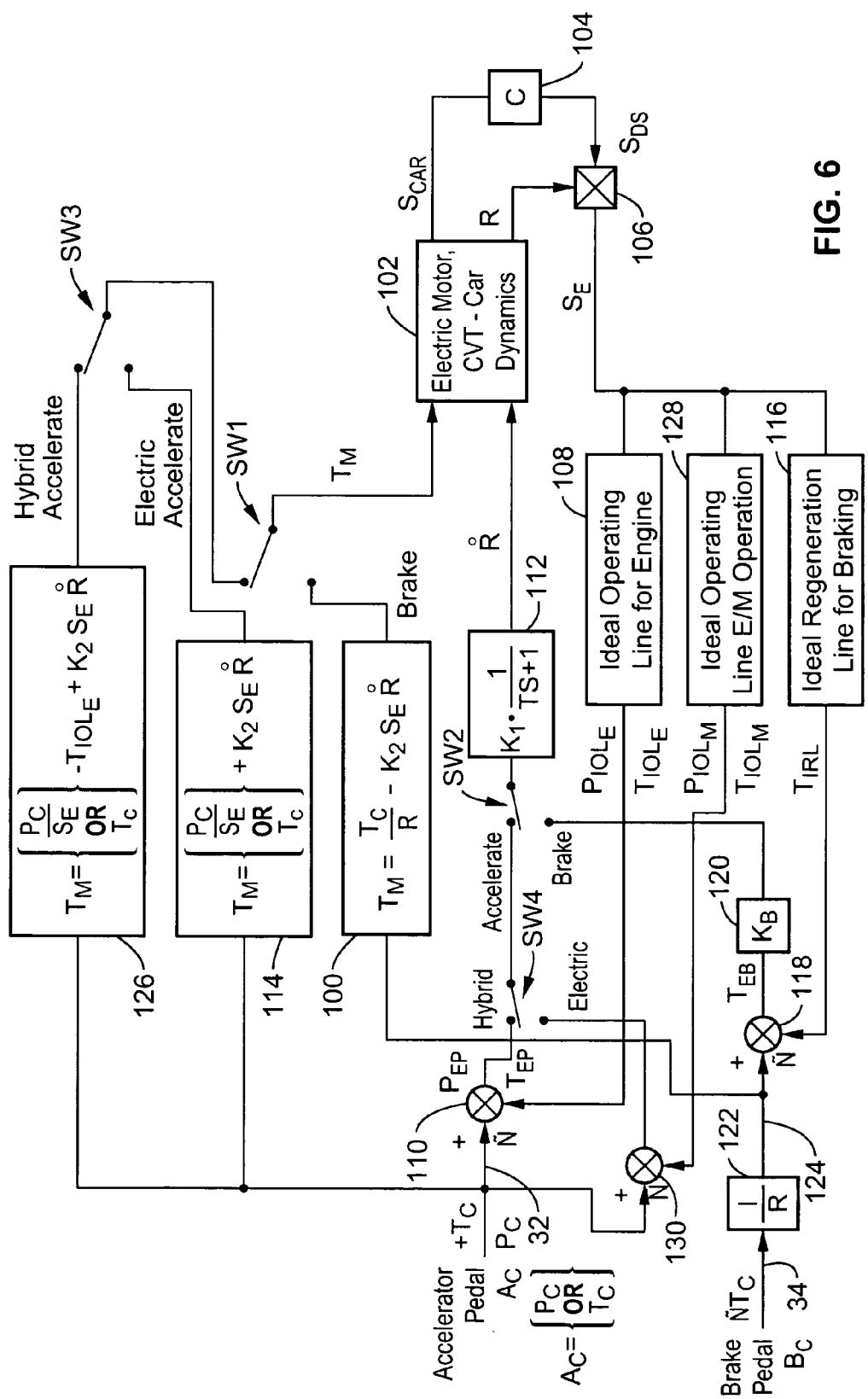
FIG. 6 is a flow diagram showing a control method for a hybrid vehicle having a continuously variable transmission.
Figure 7:
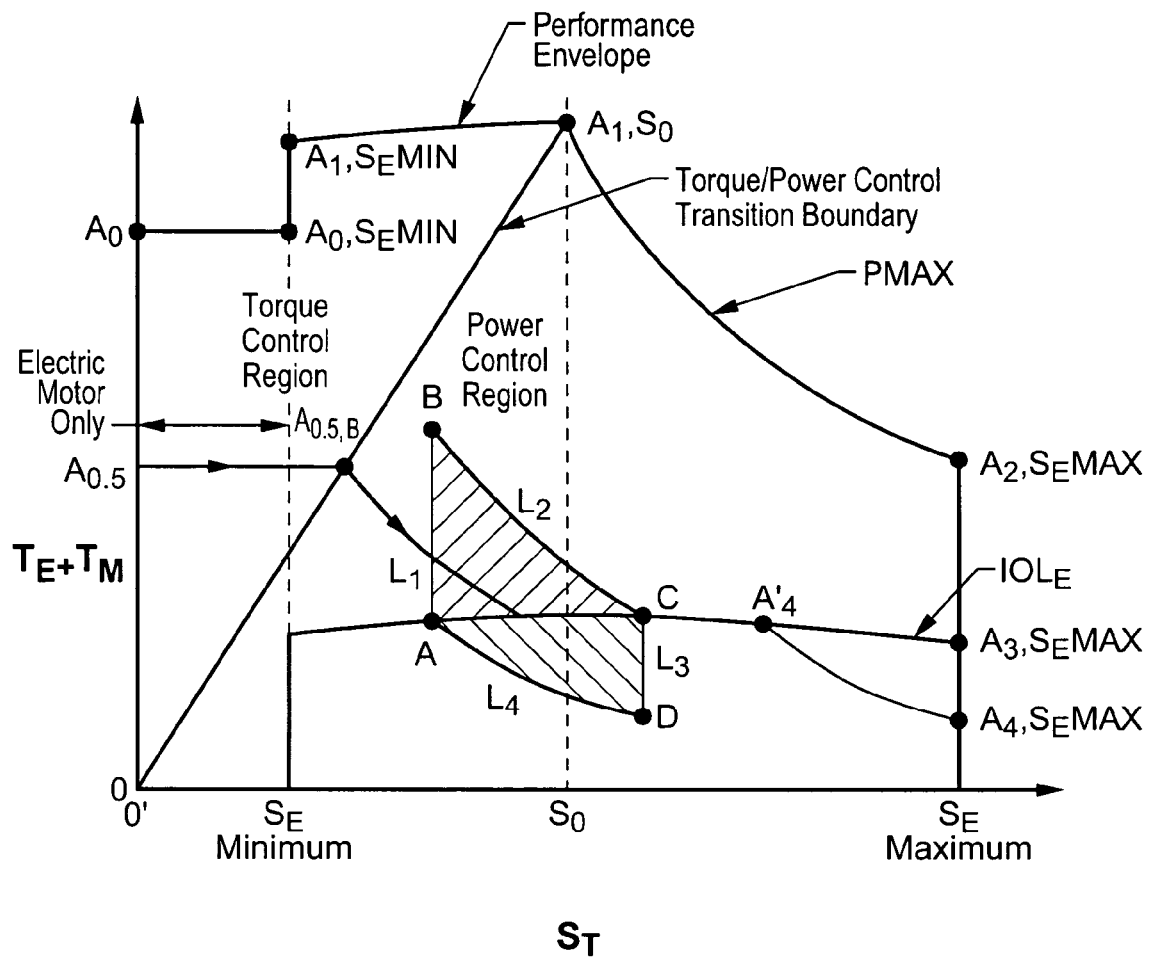
FIG. 7 is a graph showing engine and electric motor/generator torque as a function of engine and transmission speed, as well as the operational boundary for acceleration and a typical acceleration/deceleration cycle for the apparatus shown in FIG. 4.
Figure 8:
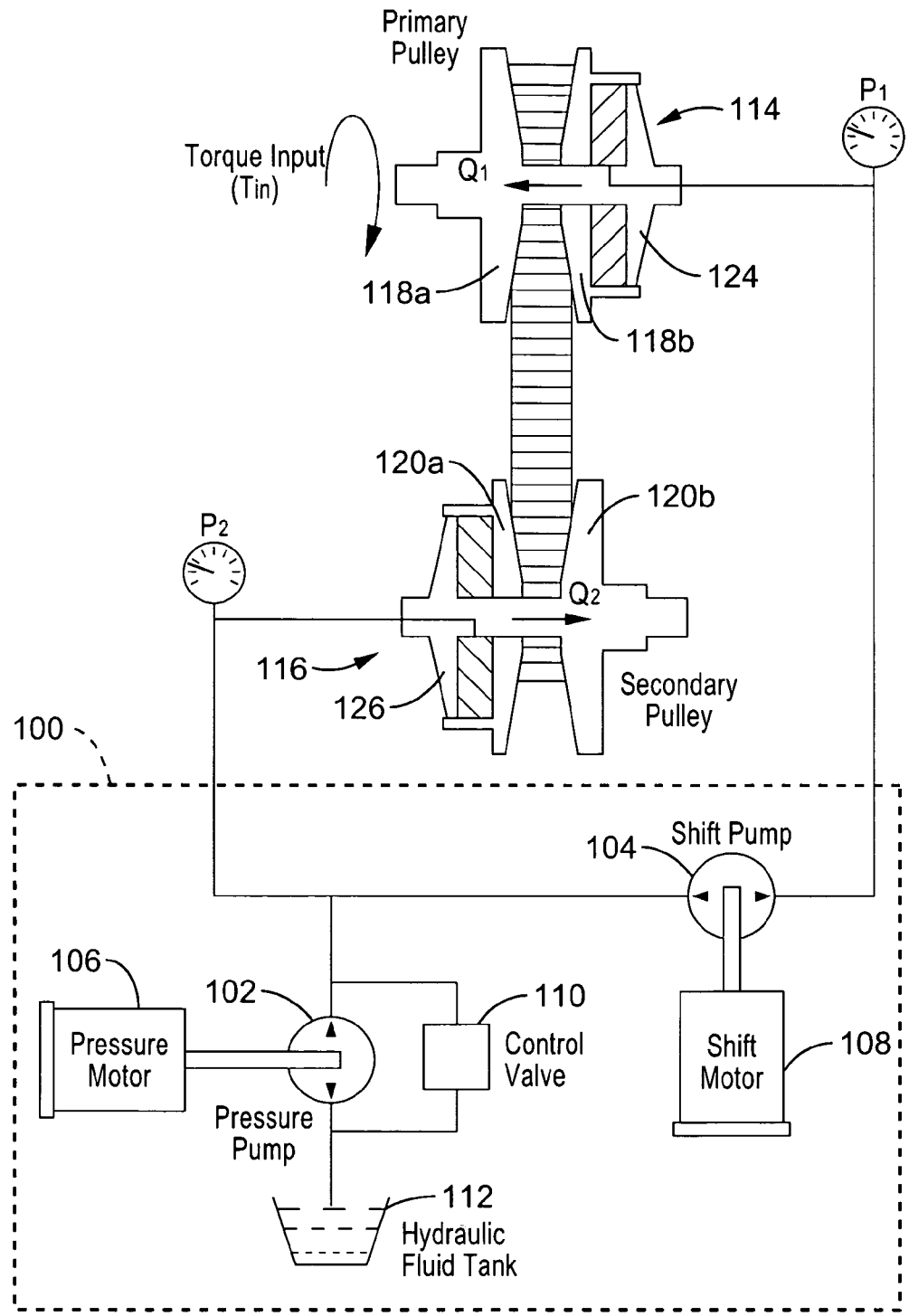
FIG. 8 is a schematic diagram of an embodiment of hydraulic pressure servo control system for controlling a CVT according to the present invention.

Referring to FIG. 8, an embodiment of a CVT physical control system according to the present invention is shown. In the general embodiment schematically shown in FIG. 8, the control system 100 comprises a hydraulic pressure pump 102, a hydraulic shift pump 104, a pressure servomotor 106, a shift servo motor 108, a control valve 110, and a hydraulic fluid tank 112. As can be seen, the control system is fluidically coupled to the primary pulley 114 and the secondary pulley 116. This control hardware can differ from that shown in FIG. 8, but in any case, it should allow for the control of both the primary and secondary pressures simultaneously.

More particularly, the invention comprises an apparatus and method for controlling a CVT having at least a pair of pulleys 114, 116 each of which has a pair of conical disks 118a, 118b and 120a, 120b, respectively, mutually coupled by a chain or belt 122 as the power transmission element, in which at least one disk of each pair is coupled to a hydraulic actuator 124, 126, respectively, as shown in FIG. 8. The invention is applicable to any CVT which allows the control of the primary and secondary pressures by one way or another. In the case where only one pressure is fully controllable, the control method described below can still be used.

Figure 9:
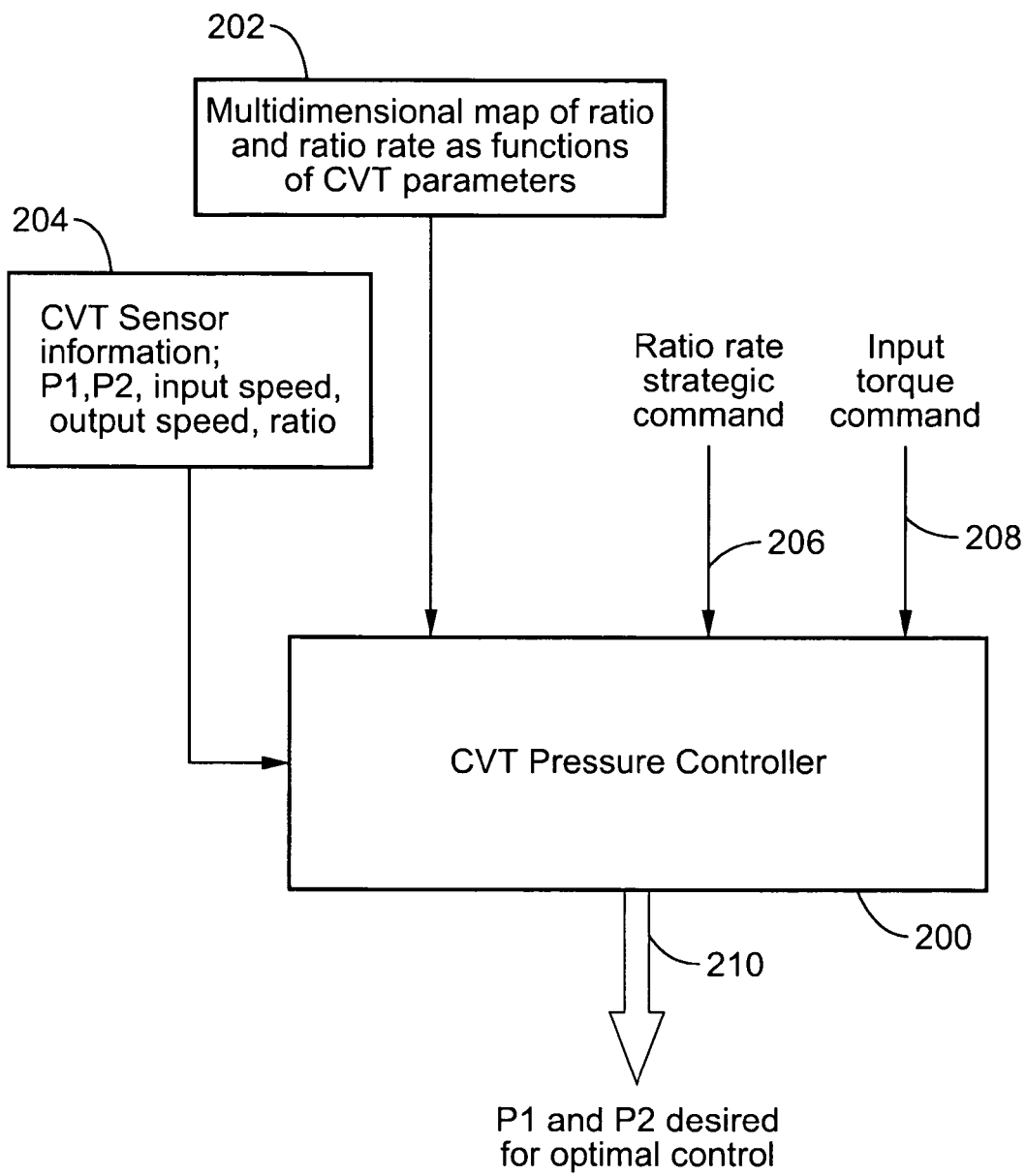
FIG. 9 is a block diagram of an embodiment of an apparatus in accordance with the present invention for controlling the pressure in a CVT by means of the control system shown in FIG. 8.

In a preferred embodiment of the invention, the primary and secondary pressures of the CVT are controlled so as to achieve an ideal commanded clamping pressure due to the input torque command and the commanded ratio rate (or shift velocity), by using previous knowledge of the operational characteristics of the CVT (e.g., obtained empirically). Referring also to FIG. 9, this will be accomplished using a computerized CVT pressures controller 200 according to the following steps:

1. First, determine the equilibrium ratio map 202 of the CVT that is being controlled. This map can be considered a complex function of the primary pressure ($P_1$), the secondary pressure ($P_2$), the torque input ($T_{in}$), the input speed and/or any combination of these variables, that returns a geometric ratio (R) corresponding to the equilibrium state that the CVT will take under these conditions. This can be expressed in terms of the following function:

$$\theta(P_1, P_2, T_{in}, \text{InputSpeed}) = (\text{ratio})_{equilibrium}$$

2. Verify that there exists some relationship(s) linking the ratio rate (rate of change of the geometric ratio) and the distance between the point corresponding to the current states 204 of the CVT ($P_1$, $P_2$, $T_{in}$, InputSpeed, ratio) and the projection of this point onto the equilibrium map previously determined. This relationship can be considered as one more dimension added to the previously described equilibrium map.

3. Using these previously determined equilibrium map and relationship(s), the primary $P_1$ and secondary $P_2$ pressures of the CVT are simultaneously controlled to achieve an optimal control for the CVT. This optimal control allows a direct control of ratio rate and/or ratio and clamping pressure. Given a ratio rate strategic command 206 and a torque input command 208, the controller uses the previously defined map and relationships and some calculations (for input torque and minimum necessary clamping pressure) to determine the optimal pressures 210 to control in both the primary and secondary hydraulic actuators in order to achieve the commands and draw a minimum of power. These optimal pressures will prevent CVT slip. The invention has also the advantage of being able to include limits on both pressures as well as limits on the shift rate onto these multidimensional maps.

It will be appreciated that the foregoing steps are implemented in software, firmware or the like associated with the controller 200. In turn, controller 200 provides one or more output signals to control pressure pump 102, shift pump 104, pressure motor 106, shift motor 108, control valve 110, and any other elements of the physical controller 100 as necessary. It will also be appreciated that a direct extension of the foregoing would be to employ a learning controller, such as a neural network or the like, which would learn, build and correct the equilibrium map and the ratio rate map as the CVT is used and controlled to compensate for oil temperature and conditions as well as changes in the internal components. In this way, an initial mapping could be used and updated based on actual operational conditions of the CVT in the field.

Another aspect of the invention is the control valve 110 shown in FIG. 8 that bypasses the pressure pump 102 driven by the pressure motor 106. This valve is open at low pressure to permit a sufficient leak and closes as the secondary pressure rises in order to limit the leak flow. This valve can be controlled by controller 200 or simply by the secondary pressure itself fighting against a spring. This leak valve makes the control system more stable and thus helps for the control of the secondary pressure. The same concept may be used in the shift servo pump 104 for control of the primary pressure.

It will be appreciated that the invention has several additional aspects, including but not limited to:

1. Design of the pulleys hydraulic piston: the ratio of the active area of the primary to the secondary hydraulic actuators can be optimized from the information provided by the equilibrium map in order to minimize the energy usage of the hydraulic control system. For example, considering the configuration of FIG. 8, noting that the ratio of thrust ($Q_1/Q_2$) is mostly in a range around 1.0, both areas should be designed to be equal so that the shift motor does not have to be used too much.

2. Selection of servomotors and pumps: from the previous aspect of the invention, and its general use, for optimal control of a CVT the maximum power, the flow of the pumps and the maximum torque and speed of the servomotors can be measured or calculated in order to select the most suitable components (in terms of cost, size, quality, effectiveness, etc) for the control hardware.

Accordingly, it will be appreciated that the present invention optimizes the control of a CVT to prevent slip under all conditions of driver inputs. By obtaining empirical data from the CVT that relates the pressure required to transmit a given torque and the ratio that results from that pressure, a formula can be derived that characterizes the pressure required to safely cause a change in ratio. That formula can then be used in the programming associated with a computer to control the operation of the CVT. The goal is to control the CVT under all driver input conditions without underloading or overloading the CVT. The controller will sense the power/torque commanded by the driver and essentially tell the CVT to shift a rate of change of ratio and transmit the desired torque.

Figure 10:
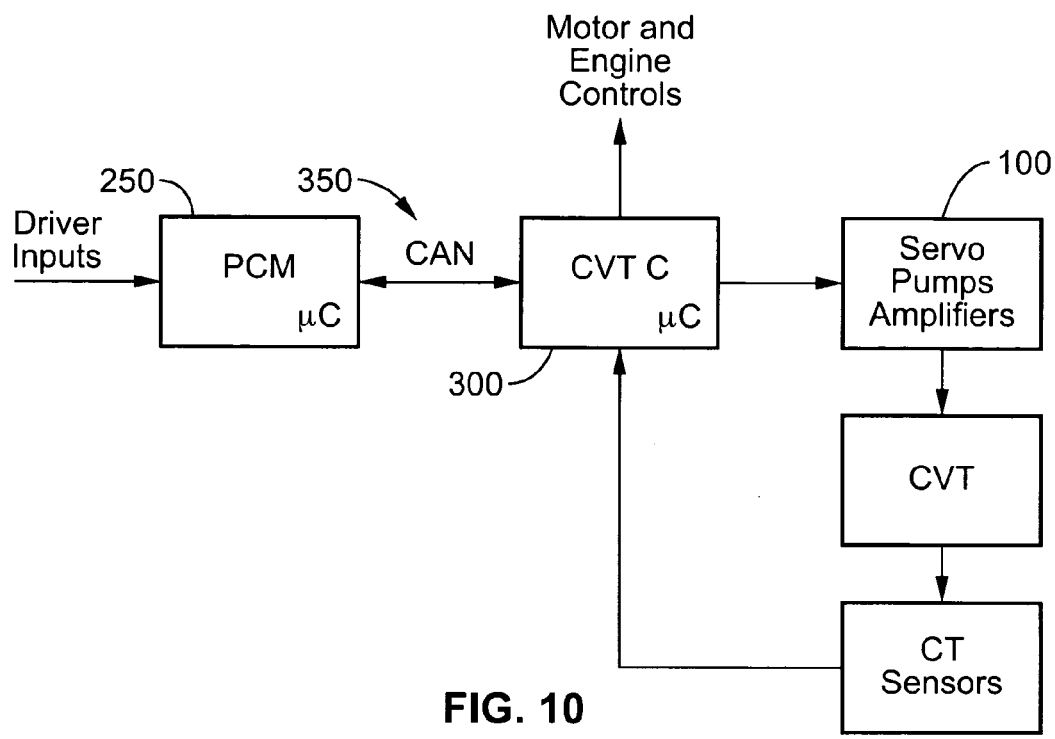
FIG. 10 is a schematic diagram of a vehicle control infrastructure according to the present invention.

Referring now to FIG. 10, CVT pressures controller 200 would typically be implemented as a component in an overall vehicle control system comprising a power control module (PCM) 240, which functions as a strategy controller, and CVT controller (CVTC) 300, which functions as a low-level controller. The functions of the CVT pressures controller would be subsumed by CVTC 300 in this configuration. The control electronics would preferably comprise PC 104 microcomputers, an industry standard for microcontroller platforms, or other microcomputers or programmed data processors. Preferably, PCM 250 and CVTC 300 communicate over a digital control area network (CAN) 3500 rather than analog channels. Digital communication ensures reliability and improves data transfer precision. PCM 250 sends strategic commands to the CVTC 300 depending on the driver's desire and the hybrid control strategy. In turn, CVTC 300 then controls the CVT by carrying out the following main tasks:

1. Uses strategic commands from the PCM 250 to determine set points for the clamping pressure and ratio.
2. Measures CVT states (pressures, ratio, speeds).
3. Calculates the transmissible torque from the CVT states.
4. Computes both ratio and pressure close loop regulations.
5. Sends commands to the CVT servomotors to operate closed loop control.
6. Sends commands to the powertrain (electric motor and/or engine) depending on the PCM strategic commands and the transmissible torque.

While the inventive servo control mechanism can be used with a conventional CVT, it is preferable to modify the pulley configuration to function with the inventive servo control mechanism described above. More particularly, to be specifically adapted for use with the inventive servo hydraulic control system, the primary and secondary pulleys are preferably designed to be identical. We will refer to this modified CVT as a Servo Controlled CVT, or SC-CVT. Use of identical primary and secondary pulleys simplifies the transmission and also reduces manufacturing and assembling costs. Additional advantages of using identical pulleys (so $A_1/A_2=1$) will be discussed in more detail later.

In our prototype SC-CVT, the gear pumps were selected to have a very small displacement (1.07 cc/rev) and rating of 3000 PSI. Both pumps were mounted inside the CVT case and connected to servomotors through holes in the case. This constituted the servo-pump system. Permanent magnet brushless DC motors were selected to drive the gear pumps. Brushless servomotors, due to the use of permanent magnets, are capable of higher torque to inertia ratios and power to size ratios than regular induction motors. Due to the cost of earth magnets, they are typically reserved for high performance applications. The servomotors were selected to have a very fast response with a mechanical time constant of 3.8 ms, a low cogging torque and a maximum theoretical acceleration of more than 55,000 rad/sec². Brushless servo amplifiers were selected to drive the direct current (DC) servomotors. The amplifiers represent the electronic power converter that drives the motor according to the controller reference signals. The amplifiers basically translate low-energy reference signals from the controller into high-energy signals (motor voltage and current). In the case of brushless motors, the amplifier is also responsible for the proper commutation of the magnetic field. A Model B30A40 from Advanced Motion Controls, for example, is suitable for interfacing with digital controllers and can be used in open loop, current close loop or speed close loop mode. For this application, the amplifiers are used in a current close loop configuration, which corresponds to controlling the torque of the DC motors.

The prototype CVTC was based on a Micro/sys SBC 1486, PC 104 type, microcontroller board, a E-CAN board to ensure network communication, a Micro/sys MPC 550 input/output board and a custom-made signal conditioning board. The control code was written in C++ and loaded through a serial port into the microcontroller. The SC-CVT was equipped with two pressure sensors, two speed sensors and a linear potentiometer for position measurement. Therefore, pressures and speeds of the primary and secondary pulleys could be measured. Proximity switches (inductive speed sensors with amplifiers) were used to sense pulley speed, and a trigger wheel was mounted on both fixed sheaves. These speed sensors output a square signal interpreted by timer/counters in the MPC 550. The position sensor was connected to the primary pulley movable sheave and its output was used to calculate the CVT geometric ratio. It will be appreciated that ratio can also be obtained using the speed signals but position sensing offers the advantage of measuring ratio even at zero speed.

Table 1 depicts the main parameters of the above-described prototype SC-CVT. It will be appreciated that these parameters are given by way of example only.

Our prototype SC-CVT had a design capacity of 700 Nm. The electric motor, through its reduction gearing, was capable of producing 540 Nm, and the engine was capable of producing up to 190 Nm. Although the theoretical maximum torque of the powertrain was 730 Nm, because the electric motor torque depends on the voltage of the battery pack, and because the maximum torque of the engine and electric motor do not occur at the same rotational speed, the maximum torque reached by this powertrain was 650 Nm. Moreover the engine could not be operated at low speed because it was directly coupled to the input pulley through an automotive clutch.

To verify the torque capacity of the SC-CVT, acceleration runs were performed with the SC-CVT installed in a 2000 Chevrolet Suburban that was converted into a parallel hybrid-electric vehicle, and powered by a 150 kW electric motor and a Saturn 2.2 liter internal combustion engine. The tests were for a 0 to 60 mph acceleration and a 60 to 0 mph deceleration range. The SC-CVT proved its torque capacity by performing this test without breaking or even slipping the chain. The deceleration observed was faster than the acceleration because the mechanical brakes were applied simultaneously on top of the 300 Nm of regenerative torque capability of the electric motor. The final time was 10.9 seconds for the 0 to 60 mph and less than 9 seconds for the 60 to 0. These results were very promising for the Suburban, considering that this truck weighs more than 3000 kg due to the lead acid battery pack on-board to power the electric motor.

A series of driving tests was conducted with the Suburban, to prove the SC-CVT concept and demonstrate the controllability of the transmission under driving conditions. The truck was also driven on standard driving cycles in order to verify the vehicle drivability and the SC-CVT performed satisfactorily.

One of the design goals of the SC-CVT was to exhibit reliable operation for the entire lifetime of a commercial vehicle; however, significant wear was observed on the chain and pulleys after less than 50 hours of operation. Such severe wear indicated macro slip of the chain on the pulleys. Macro slip occurs when the clamping forces, applied by the pulleys on the chain, become too low to transmit the torque applied by either the input or output pulley. To avoid further macro slip occurrence, a 10% safety factor was added to the clamping pressure map, and no additional wear was observed. This experience illustrates the major failure of CVTs, and reinforces the need of a close loop regulation on the clamping pressure as well as a complete knowledge of the limitation of the particular CVT in use. This last factor was certainly the one to blame in this case since this transmission was the first of its kind ever made.

From the foregoing, it will be appreciated that in order to control the primary and second pressures to achieve a desired rate of change of ratio, certain information regarding the CVT is required to develop the equilibrium maps and other control parameters. A more detailed discussion of the operational theory and implementation follows.

CVT Dynamic Equations

The dynamic ratio of a CVT is defined as the ratio of the input speed divided by the output speed. It can be measured only when both speeds are greater than zero and becomes more accurate as speed increases.

$$i = \frac{\omega_1}{\omega_2} \qquad (1)$$

By taking the derivative of (1):

$$\dot{\omega}_1 = i \cdot \dot{\omega}_2 + \omega_2 \cdot \dot{i} \qquad (2)$$

Figure 11:
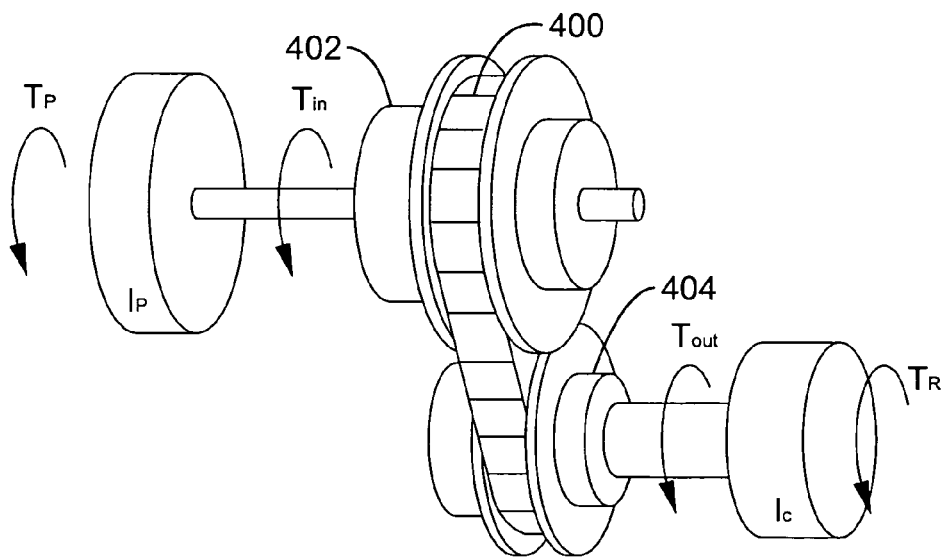
FIG. 11 is a simplified schematic of a CVT powertrain.

The simplified schematic presented in FIG. 11 is used to derive the dynamic equations. The chain 400 is considered massless, the chain slip is assumed to be zero and the inertia of the CVT primary 402 and secondary 404 pulleys are taken into account in the powertrain and vehicle inertias (Ip and Ic, respectively).

From the dynamic ratio, the relation between input and output torque is as follows, when neglecting the chain losses:

$$i = \frac{T_{out}}{T_{in}} \quad (3)$$

Using, Newton's law at the primary and secondary pulleys:

$$\dot{\omega}_1 \cdot I_p = T_P - T_{in} \quad (4)$$

$$\dot{\omega}_2 \cdot I_c = T_{out} - T_R \quad (5)$$

Substituting (3) into (5):

$$\dot{\omega}_2 \cdot I_c = i \cdot T_{in} - T_R \quad (6)$$

then, using (4) and (2) in (6):

$$\dot{\omega}_2 \cdot I_c = i \cdot T_P - i^2 \cdot \dot{\omega}_2 \cdot I_p - i \cdot I_p \cdot i \cdot \omega_2 - T_R \quad (7)$$

Finally, substituting (1) into (7) and solving for the vehicle acceleration:

$$\dot{\omega}_2 = \frac{i \cdot T_p - I_p \cdot \dot{i}, \omega_1 - T_R}{I_c + i^2 \cdot I_p} \quad (8)$$

Note that the second term in the numerator depends on the rate of change of ratio (i). This translates into an acceleration of the vehicle due to the shift rate of the transmission. Up-shifting causes a positive acceleration, whereas down-shifting causes a deceleration of the vehicle. This can sound surprising at first but it comes from the transfer of kinetic energy from the powertrain inertia to the vehicle inertia, resulting in negative acceleration. This equation is not specific to CVTs but can be applied to any transmission. However, in the case of discrete gear transmissions, the powertrain has to be decoupled from the transmission in order to shift, causing a much more complex phenomenon and making equation (8) not applicable. In CVTs, the rate of change of ratio is usually limited to reduce the effect of this term on the vehicle drivability. In the case of parallel hybrids, the acceleration induced by the rate of change of ratio can be compensated by using the electric traction motor to supply a compensating torque. To do this effectively, the motor torque needs to be substantially larger than the engine IOL torque, and the compensation torque depends on the shifting speed desired.

CVT Geometry

Figure 12:
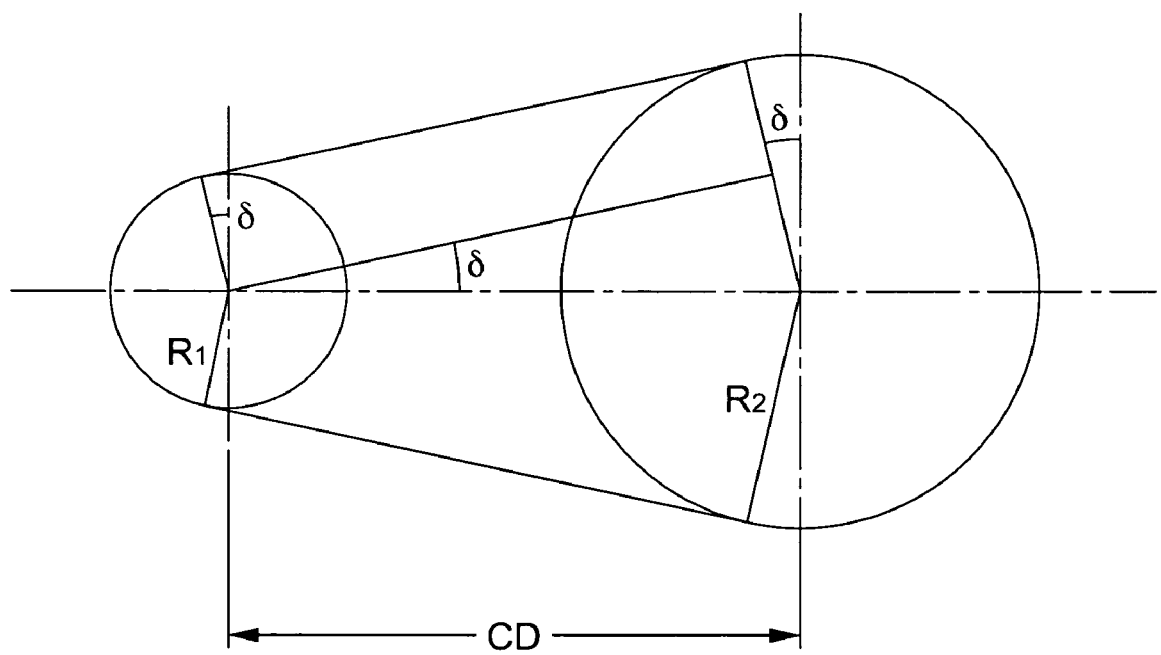
FIG. 12 is a diagram showing the basic geometry of a CVT powertrain corresponding to FIG. 11.

The basic geometry of a CVT is presented in FIG. 12. The geometric ratio can be calculated from the running radii $R_1$ and $R_2$.

$$r = \frac{R_2}{R_1} \quad (9)$$

The geometric ratio is equivalent to the dynamic ratio when the chain slip is null. This leads to the definition of slip:

$$S = \frac{i - r}{i} \quad (10)$$

The slip depends on the amount of torque transmitted through the transmission, the clamping forces applied and the geometric ratio. Micro-slip is normal and can get up to 6% with a van Doorne push belt. The GCI chain is supposed to limit micro-slip to less than 4%.

If the chain is assumed to be inextensible, the chain length can be used to constrain the relationship between running radii ($R_1$ and $R_2$). The angle $\delta$ is determined by the geometric ratio r. $\delta$ will be considered positive in the orientation drawn in FIG. 12 and negative when $R_1$ is greater than $R_2$. The resulting geometric relationship for the chain length is given below:

$$L = 2 \cdot \delta \cdot (R_2 - R_1) + \pi \cdot (R_2 + R_1) + 2 \cdot CD \cdot \cos \delta \quad (11)$$

$$\delta = \arcsin\left(\frac{R_2 - R_1}{CD}\right) \quad (12)$$

Using second-degree Taylor series expansions of cosine and sine, equations (11) and (12) become:

$$L = 2 \cdot \delta \cdot (R_2 - R_1) + \pi \cdot (R_2 + R_1) + 2 \cdot CD - CD \cdot \delta^2 \quad (13)$$

$$\delta = \frac{R_2 - R_1}{CD} \quad (14)$$

Substituting (14) into (13), the chain length constraint equation becomes:

$$L = \frac{(R_2 - R_1)^2}{CD} + \pi \cdot (R_2 - R_1) + 2 \cdot CD \quad (15)$$

Finally, solving the quadratic equation for either running radii:

$$R_2 = R_1 - \frac{\pi}{2} \cdot CD + \sqrt{\frac{CD^2 \cdot \pi^2}{4} - 2 \cdot \pi \cdot CD \cdot R_1 - 2 \cdot CD^2 + CD \cdot L} \quad (16)$$

$$R_1 = R_2 - \frac{\pi}{2} \cdot CD + \sqrt{\frac{CD^2 \cdot \pi^2}{4} - 2 \cdot \pi \cdot CD \cdot R_2 - 2 \cdot CD^2 + CD \cdot L} \quad (17)$$

Now either running radius can be measured to determine the other one and then the geometric ratio r. Because the sheaves are conical and the chain width is invariant and known, there is a linear relation between the lateral position of a movable sheave and the running radius of the corresponding pulley. In the configuration shown in FIG. 8, the primary pulley movable sheave position is measured in order to determine $R_1$, then using equations (16) and (9), the geometric ratio r is obtained.

Figure 13:
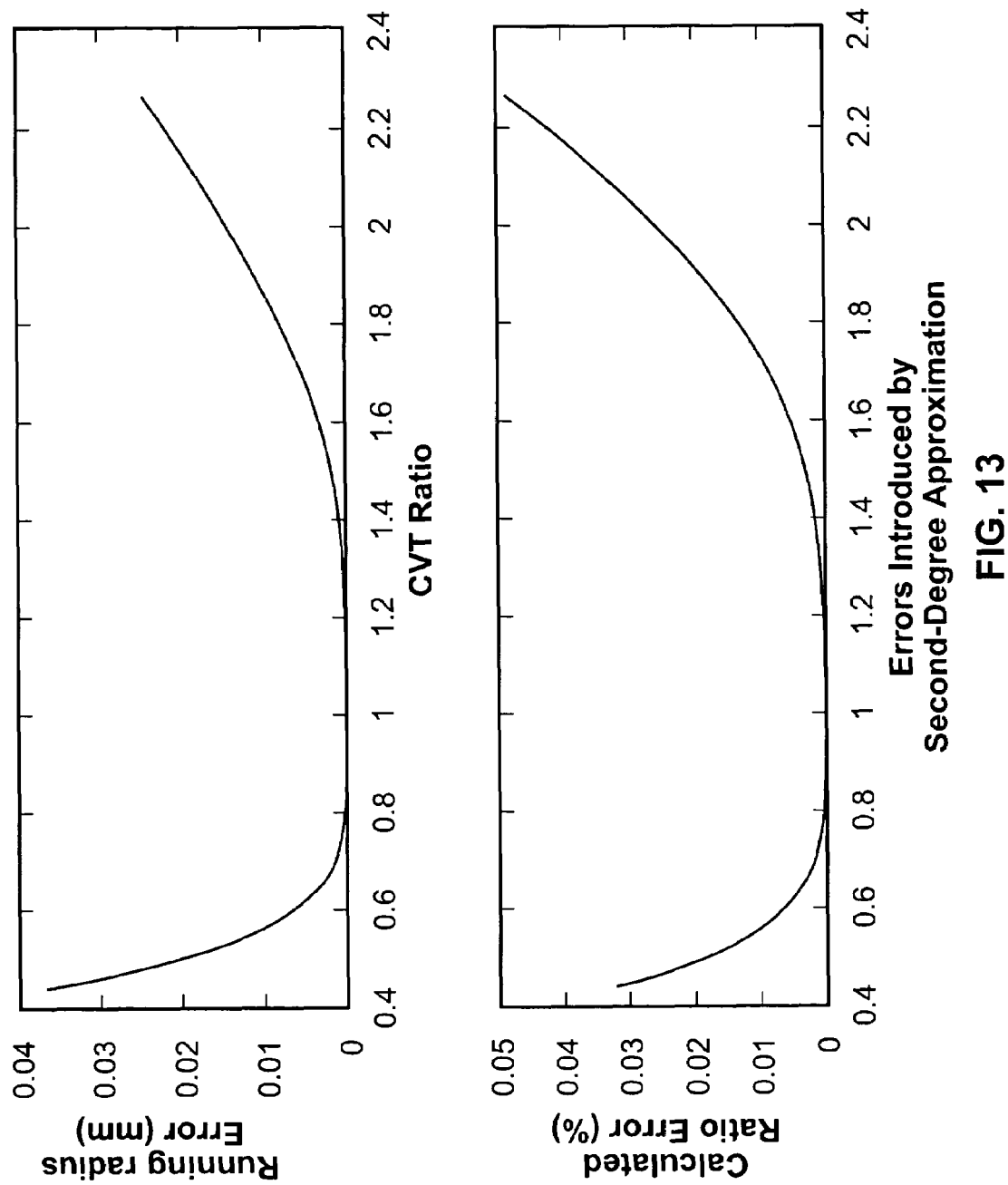
FIG. 13 is a series of graphs illustrating errors introduced by second-degree approximation in CVT dynamic equations.

Equations (16) and (17) have been derived using a simplified model and therefore they do not constitute an exact result. The error caused from the second-degree approximation of equation (11) and (12) resulting in simplified constraint (15) has been verified to be reasonably small (see FIG. 13).

Chain Misalignment

Figure 14:
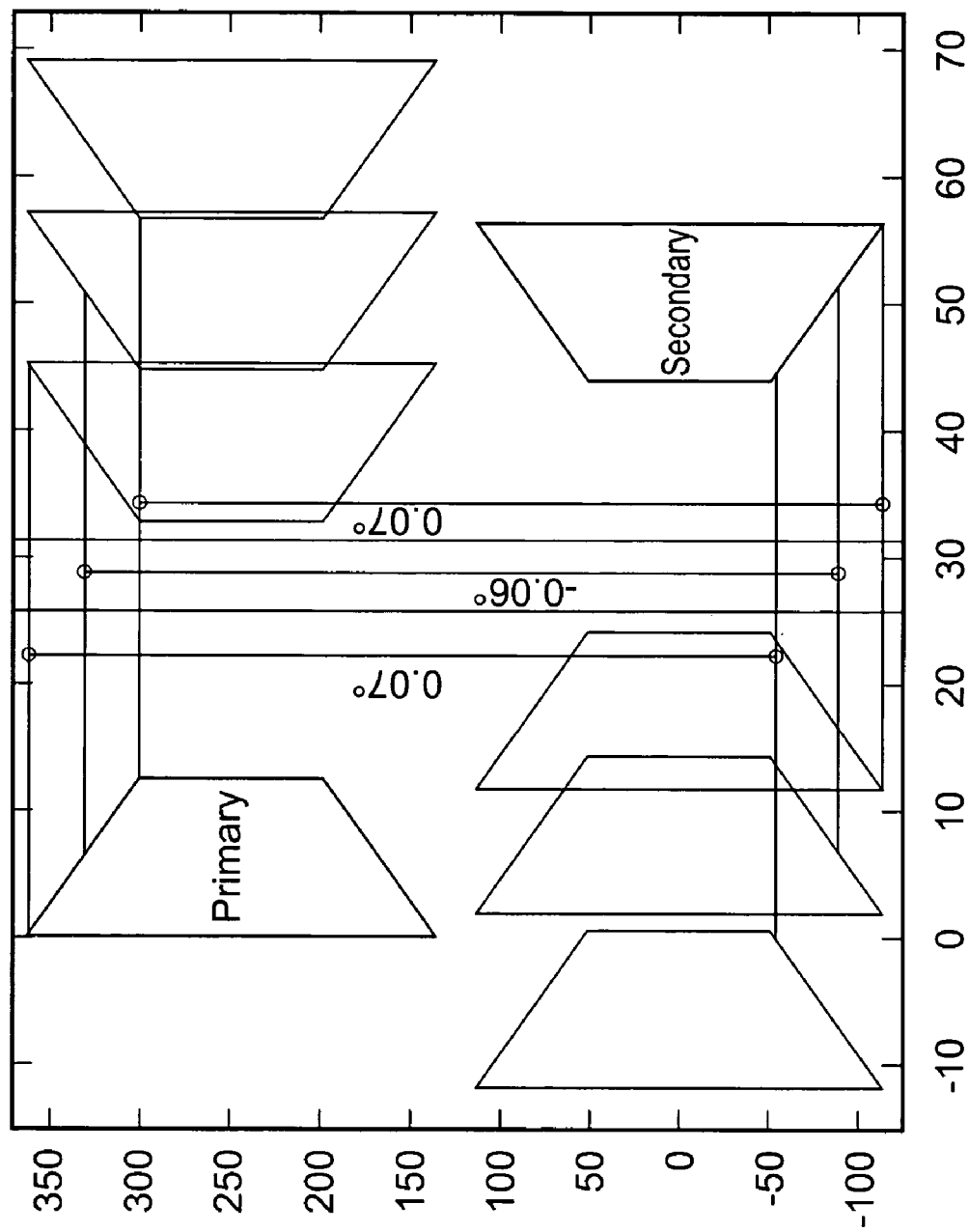
FIG. 14 is diagram illustrating CVT chain misalignment for different geometric ratios when one sheave is moveable and the other is fixed.
Figure 15:
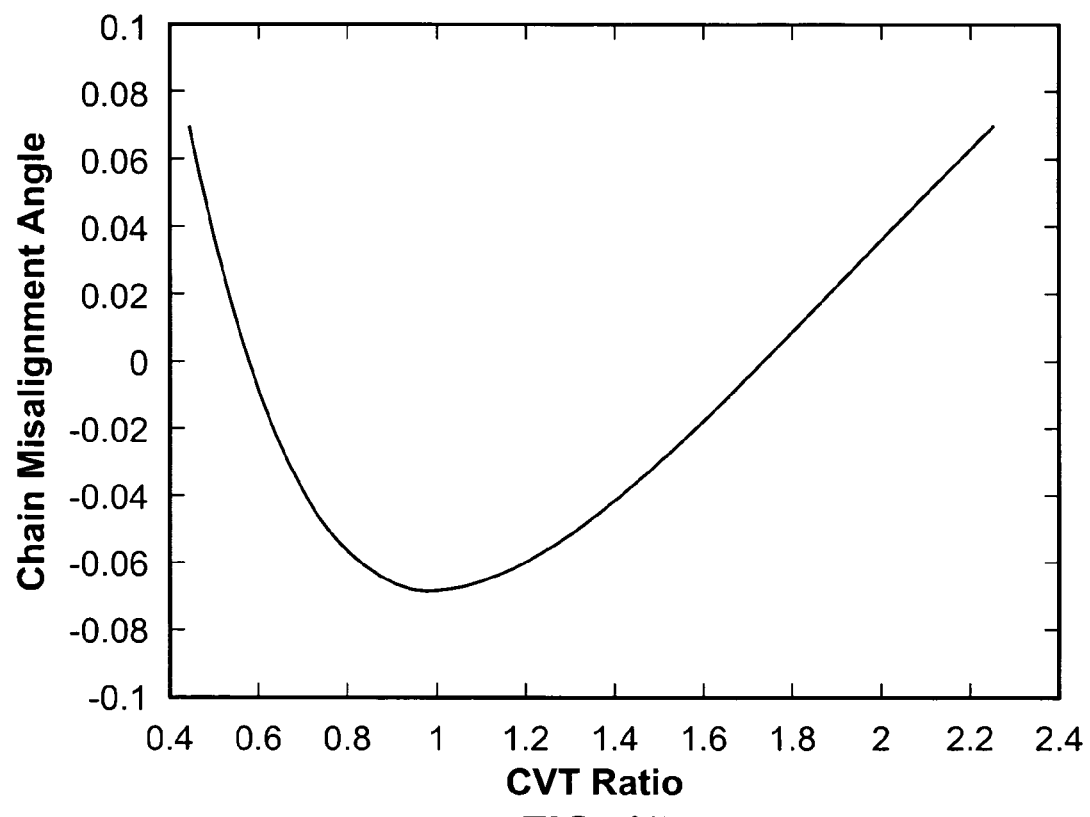
FIG. 15 is a graph showing the relationship between chain misalignment angle and ratio for fixed sheaves.

Because only one sheave in each pulley is able to move in axial direction (in and out) while the other stays fixed, and because the pulleys are cones whose apexes lie on the centerline of the sheaves, the chain cannot run in a plane perpendicular to the pulley axes at any geometric ratio. FIG. 14 illustrates this deviation. To prevent this deviation, it is possible to make the cone-form of the v-sheave slightly and outwardly spherical or crowned. This would increase manufacturing costs and require that a high accuracy be maintained during the complete CVT life. However the belt and chain can endure a small misalignment. In the case of the present design, if the fixed sheaves are well positioned, the misalignment angle can be kept below 0.07° as shown in FIG. 15.

Clamping Map

Figure 16:
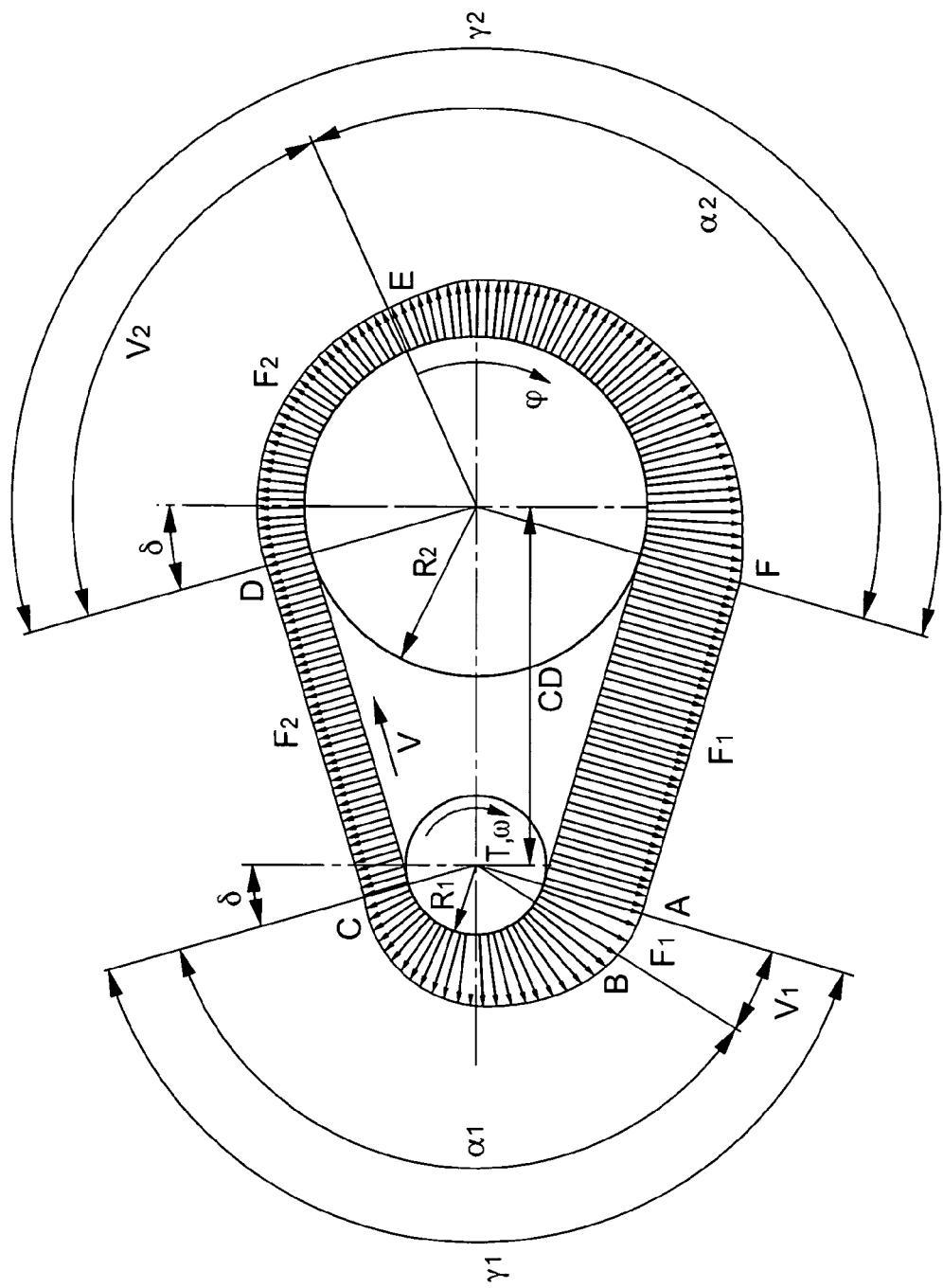
FIG. 16 is a diagram illustrating tensile forces in a positive torque condition in a v-belt drive CVT.

In order to calculate clamping forces, it is necessary to understand the torque transmission mechanism in a CVT. FIG. 16 shows the force distribution in a v-belt drive CVT. The vectors drawn perpendicular to the transmission element represent the magnitude of the tension force acting on the chain at a particular point. For the case shown the torque input is positive, which means that the torque is applied in the direction of rotation. This also results in $F_1$ being greater than $F_2$.

The contacting arcs $\gamma_1$ and $\gamma_2$ depend on the geometric ratio r and are given by the following equations:

$$\gamma_1 = \pi - 2\cdot\delta \quad (18)$$

$$\gamma_2 = \pi + 2\cdot\delta \quad (19)$$

Combining (18) and (19), leads to:

$$\gamma_2 - \gamma_1 = 4\cdot\delta \quad (20)$$

Six different regions can be distinguished along the chain, starting from the primary pulley chain entrance:

(1) From point A to point B: angle $v_1$ is the primary pulley rest arc, the tension force is constant and equal to $F_1$.

(2) From point B to point C: angle $\alpha_1$ is the primary pulley active arc, the tension force decreases gradually from $F_1$ to $F_2$.

(3) From point C to point D: slack side of the chain, the force is constant and equal to $F_2$.

(4) From point D to point E: angle $v_2$ is the secondary pulley rest arc, the tension force is constant and equal to $F_2$.

(5) From point E to point F: angle $\alpha_2$ is the primary pulley active arc, the tension force increases gradually from $F_2$ to $F_1$.

(6) From point F to point A: tight side of the chain, the force is constant and equal to $F_1$.

The Eytelwein formula describes the forces distribution in a v-groove belt system:

$$F(\varphi) = F_2 \cdot e^{\frac{\mu\cdot\varphi}{\sin\beta}} \quad (21)$$

Here, $\beta$ is the half wedge angle of the sheaves (11° in the SC-CVT), is an angle in the active arc $\alpha$, ($0 \leq \varphi \leq \alpha$), and $\mu$ is the coefficient of friction (0.09 for steel belt and chain CVTs). The force distribution on both pulleys must satisfy the Eytelwein formula. Since $\mu$ and $\beta$ are the same on both pulleys, the force distribution follows the same profile in the active arc when the force decreases from $F_1$ to $F_2$ or increases from $F_2$ to $F_1$. Therefore, $\alpha_1 = \alpha_2 = \alpha$.

The slip limit is reached when the contacting arc $\gamma$ is used in totality to transmit the torque, which means that the rest arc $v$ is equal to 0. Slip occurs when the contacting arc is smaller than the active arc needed to transmit the amount of torque applied. Since the active arc is the same in both pulleys, the first side to slip is always the pulley with the smallest contacting arc and thereby the smallest running radius. Therefore to prevent the chain from slipping, the chain has to be slightly over-clamped causing both pulleys to show a rest arc $v$ at all times.

Figure 17:
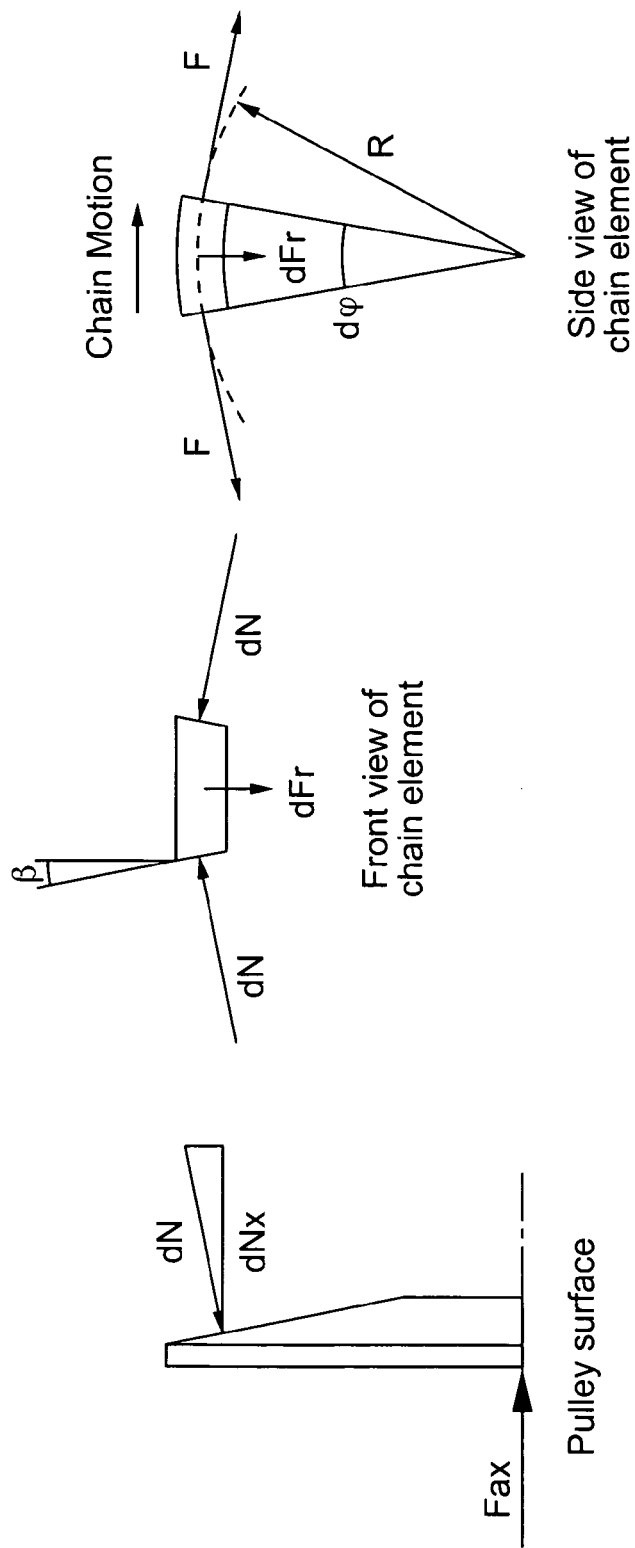
FIG. 17 is a series of diagrams illustrating forces on an infinitesimal portion of a chain and the contact forces on a sheave.

We now examine the clamping forces and the way they act between the chain and pulleys. FIG. 17 shows an infinitesimal portion of chain of length and the contact forces on a sheave. The equilibrium of forces on the infinitesimal portion of the chain results in:

$$dF_r = 2\cdot F \cdot \sin\left(\frac{d\varphi}{2}\right) \approx F\cdot d\varphi \quad (22)$$

and $$dN = \frac{dF_r}{2\cdot\sin\beta} \quad (23)$$

At the contact point, $$dN_x = dN \cdot \cos\beta \quad (24)$$

Then, using equations (22) through (24), $$Dn_X = \frac{F}{2\cdot\tan\beta} \cdot d\varphi \quad (25)$$

Now, by integrating $dN_x$ over the contacting arc:

$$F_{ax} = \int_\gamma \frac{f(\varphi)}{2\cdot\tan\beta} d\varphi \quad (26)$$

is known from FIG. 16 and equation (21). Hence, $$F_{ax_{1,2}} = \int_0^\alpha \frac{F_2}{2\cdot\tan\beta} \cdot e^{\frac{\mu\cdot\varphi}{\sin\beta}} \cdot d\varphi + \int_0^{v_{1,2}} \frac{F_{1,2}}{2\cdot\tan\beta} \cdot d\varphi \quad (27)$$

Indices 1,2 in this formula refer respectively to the primary and secondary pulleys. By integrating equation (27), the clamping forces in both pulleys can be calculated.

$$F_{ax_{1,2}} = \frac{F_2 \cdot \cos\beta}{2\cdot\mu}\left(e^{\frac{\mu\cdot\alpha}{\sin\beta}} - 1\right) + \frac{F_{1,2}}{2\cdot\tan\beta} \cdot v_{1,2} \quad (28)$$

The equilibrium of forces on the input sheave translates to:

$$\frac{T_{in}}{R_1} = F_1 - F_2 \quad (29)$$

Also from the Eytelwein formula, when:

$$\frac{F_1}{F_2} = e^{\frac{\mu \cdot \alpha}{\sin \beta}} \quad (30)$$

Solving (29) and (30) for the forces $F_1$ and $F_2$:

$$F_1 = \frac{T_{in}}{R_1} \left( \frac{e^{\frac{\mu \cdot \alpha}{\sin \beta}}}{e^{\frac{\mu \cdot \alpha}{\sin \beta}} - 1} \right) \quad (31)$$

and, $$F_2 = \frac{T_{in}}{R_1} \left( \frac{1}{e^{\frac{\mu \cdot \alpha}{\sin \beta}} - 1} \right) \quad (32)$$

Substituting (31) and (32) into (28), leads to the general equations for the clamping forces for positive torque:

$$F_{ax_1} = \left( \frac{\cos \beta}{2 \cdot \mu} + \frac{e^{\frac{\mu \cdot \alpha}{\sin \beta}}}{e^{\frac{\mu \cdot \alpha}{\sin \beta}} - 1} \cdot \frac{\gamma_1 - \alpha}{2 \cdot \tan \beta} \right) \cdot \frac{T_{in}}{R_1} \quad (33)$$

and, $$F_{ax_2} = \left( \frac{\cos \beta}{2 \cdot \mu} + \frac{1}{e^{\frac{\mu \cdot \alpha}{\sin \beta}} - 1} \cdot \frac{\gamma_2 - \alpha}{2 \cdot \tan \beta} \right) \cdot \frac{T_{in}}{R_1} \quad (34)$$

In equations (33) and (34), the influence of the ratio is represented through $R_1$, and the active arcs ($\gamma_1$ and $\gamma_2$), and the equation is highly nonlinear. On the other hand, the relation between the clamping forces and the torque input is linear. The differences ($\gamma_1-\alpha$) in (33) and ($\gamma_2-\alpha$) in (34) represent the over-clamping on the primary and secondary pulleys, respectively.

Figure 18:
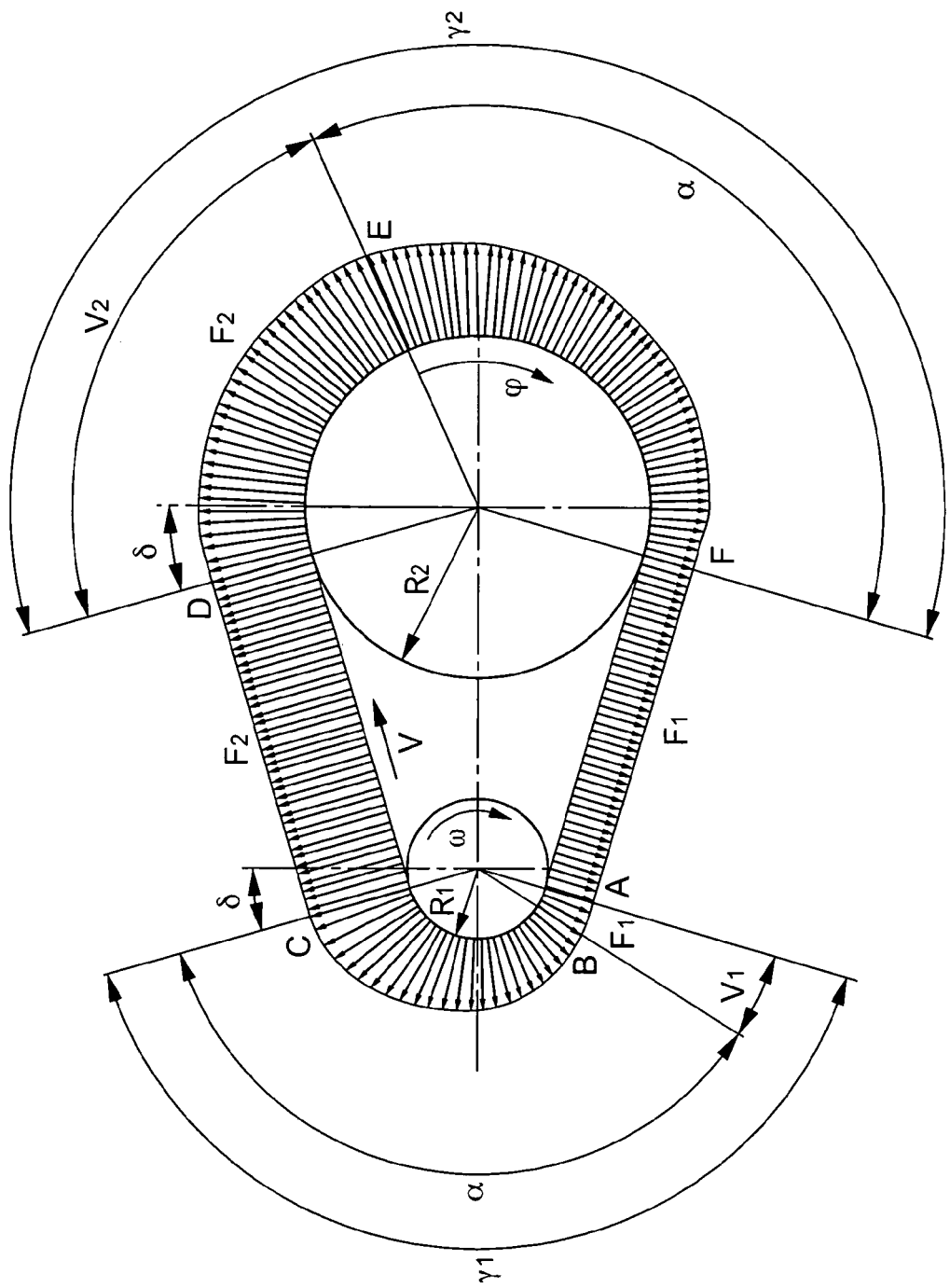
FIG. 18 is a diagram illustrating tensile forces in a negative torque condition in a v-belt drive CVT.

The negative torque case (when the powertrain is used to regenerate vehicle kinetic energy) cannot be assumed identical and symmetric to the positive torque case, because the rest arc takes place at the entrance side of the pulleys. The negative torque input case is shown in FIG. 18. The slack side and tight side are now switched, so $F_2$ is applied along the arc AB (arc $v_1$) and $F_1$ is applied along the arc DE (arc $v_2$). Looking at both FIG. 16 and FIG. 18, it can be observed that, at this ratio, the secondary clamping force ($Fax_2$) would have to be higher for the negative torque case than for the positive.

Following the same steps as for the positive torque case, the general equations for the clamping forces for negative torque are obtained:

$$F_{ax_1} = \left( \frac{\cos \beta}{2 \cdot \mu} + \frac{1}{e^{\frac{\mu \cdot \alpha}{\sin \beta}} - 1} \cdot \frac{\gamma_1 - \alpha}{2 \cdot \tan \beta} \right) \cdot \frac{T_{in}}{R_1} \quad (35)$$

and, $$F_{ax_2} = \left( \frac{\cos \beta}{2 \cdot \mu} + \frac{e^{\frac{\mu \cdot \alpha}{\sin \beta}}}{e^{\frac{\mu \cdot \alpha}{\sin \beta}} - 1} \cdot \frac{\gamma_2 - \alpha}{2 \cdot \tan \beta} \right) \cdot \frac{T_{in}}{R_1} \quad (36)$$

Minimum Clamping Forces

To determine the minimum clamping forces at slip limit, equations (33) to (36) are used in the special case where the active arc $\alpha$ equals the smallest contacting arc. Two cases must be considered. The cases are (a) the geometric ratio r is between low gear and 1:1 ($r \geq 1$), in which case the primary pulley is the first one to slip; or (b) r is between 1:1 and overdrive ($r \leq 1$), in which case the secondary pulley reaches the slip limit first.

From equations (20), (33) to (36), and setting $\gamma_1 = \alpha$ for r higher than 1:1 and $\gamma_2 = \alpha$ for r lower than 1:1, one obtains:

Positive torque
$r \geq 1$:

$$F_{ax_{1min}} = \left( \frac{\cos \beta}{2 \cdot \mu} \right) \cdot \frac{T_{in}}{R_1} \quad (37)$$

and $$F_{ax_{2min}} = \left( \frac{\cos \beta}{2 \cdot \mu} + \frac{1}{e^{\frac{\mu \gamma_1}{\sin \beta}} - 1} \cdot \frac{2 \cdot \delta}{\tan \beta} \right) \cdot \frac{T_{in}}{R_1} \quad (38)$$

$r \leq 1$:

$$F_{ax_{1min}} = \left( \frac{\cos \beta}{2 \cdot \mu} + \frac{e^{\frac{\mu \gamma_2}{\sin \beta}}}{e^{\frac{\mu \gamma_2}{\sin \beta}} - 1} \cdot \frac{2 \cdot \delta}{\tan \beta} \right) \cdot \frac{T_{in}}{R_1} \quad (39)$$

and $$F_{ax_{2min}} = \left( \frac{\cos \beta}{2 \cdot \mu} \right) \cdot \frac{T_{in}}{R_1} \quad (40)$$

Negative torque
$r \geq 1$:

$$F_{ax_{1min}} = \left( \frac{\cos \beta}{2 \cdot \mu} \right) \cdot \frac{T_{in}}{R_1} \quad (41)$$

and $$F_{ax_{2min}} = \left(\frac{\cos\beta}{2\cdot\mu} + \frac{e^{\frac{\mu\cdot\gamma_1}{\sin\beta}}}{e^{\frac{\mu\cdot\gamma_1}{\sin\beta}} - 1} \cdot \frac{2\cdot\delta}{\tan\beta}\right) \cdot \frac{T_{in}}{R_1} \quad (42)$$

$r \leq 1$:

$$F_{ax_{1min}} = \left(\frac{\cos\beta}{2\cdot\mu} + \frac{1}{e^{\frac{\mu\cdot\gamma_2}{\sin\beta}} - 1} \cdot \frac{2\cdot\delta}{\tan\beta}\right) \cdot \frac{T_{in}}{R_1} \quad (43)$$

and $$F_{ax_{2min}} = \left(\frac{\cos\beta}{2\cdot\mu}\right) \cdot \frac{T_{in}}{R_1} \quad (44)$$

Equilibrium Map

Equations (37) to (44) define the axial forces to be applied to both pulleys to prevent slip of the chain for any given input torque and ratio. The smallest contacting arc of each of the two pulleys has been considered as fully used to transmit torque. Thus, the CVT is at the slip limit all the time. Now, the properties of the CVT fluid are not perfectly known and can change with temperature. The torque input to the transmission is usually not measured but evaluated based upon previously determined engine and/or motor map; and, the force feedback is calculated by measuring the pressure. Because of these facts, the CVT cannot be controlled based solely on equations (37) to (44). So some safety margin must be added in order to prevent any macro slip occurrence.

Due to the action/reaction principle, clamping forces applied at the secondary result in forces at the primary. In general, the secondary pressure is controlled and referred to as the clamping pressure; but the primary pressure could be used for that purpose as well. One disadvantage of controlling the primary pressure for clamping forces is that, in the positive torque case, the clamping force as a function of ratio is non-monotonic (see FIG. 22) whereas the secondary clamping force function is monotonic for both positive and negative torque. Secondary pressure is referred to as the CVT clamping pressure and is used for the feedback control of the transmissible torque through the transmission. In order to keep the transmission ratio constant, the primary pressure is used to balance the effort caused by the clamping pressure. Steady state is achieved when an equilibrium is established for the torque input, the geometric ratio, the secondary clamping force and the primary clamping force. This equilibrium involves four variables; the first two (Tin, r) are commands and the other two are the clamping forces needed to operate the transmission properly. In order to calculate the equilibrium parameters for a given state, equations (33) and (34) are used for positive torque, and equations (35) and (36) for negative torque.

In the case of positive or driving torque, equation (34) can be used to determine the active arc a from the secondary clamping force, the torque input and the geometric ratio. Then the active arc is used in (33) with the torque input and geometric ratio to calculate the primary clamping force that corresponds to the steady state operation of the CVT.

Expressed in this way, steady state operation of the CVT is a three-degree of freedom problem as three independent variables can be specified. The steady state of the CVT can also be expressed as a two-degree of freedom problem in which one of the following parameters can be specified once the other two are constrained:

1. $F_1/F_2$: ratio of primary and secondary clamping forces;
2. $T_{in}/T_{max}$: torque ratio; torque input divided by the maximum transmissible torque for the given transmission ratio and secondary clamping pressure; and
3. r: the geometric ratio of the transmission.

Figure 20:
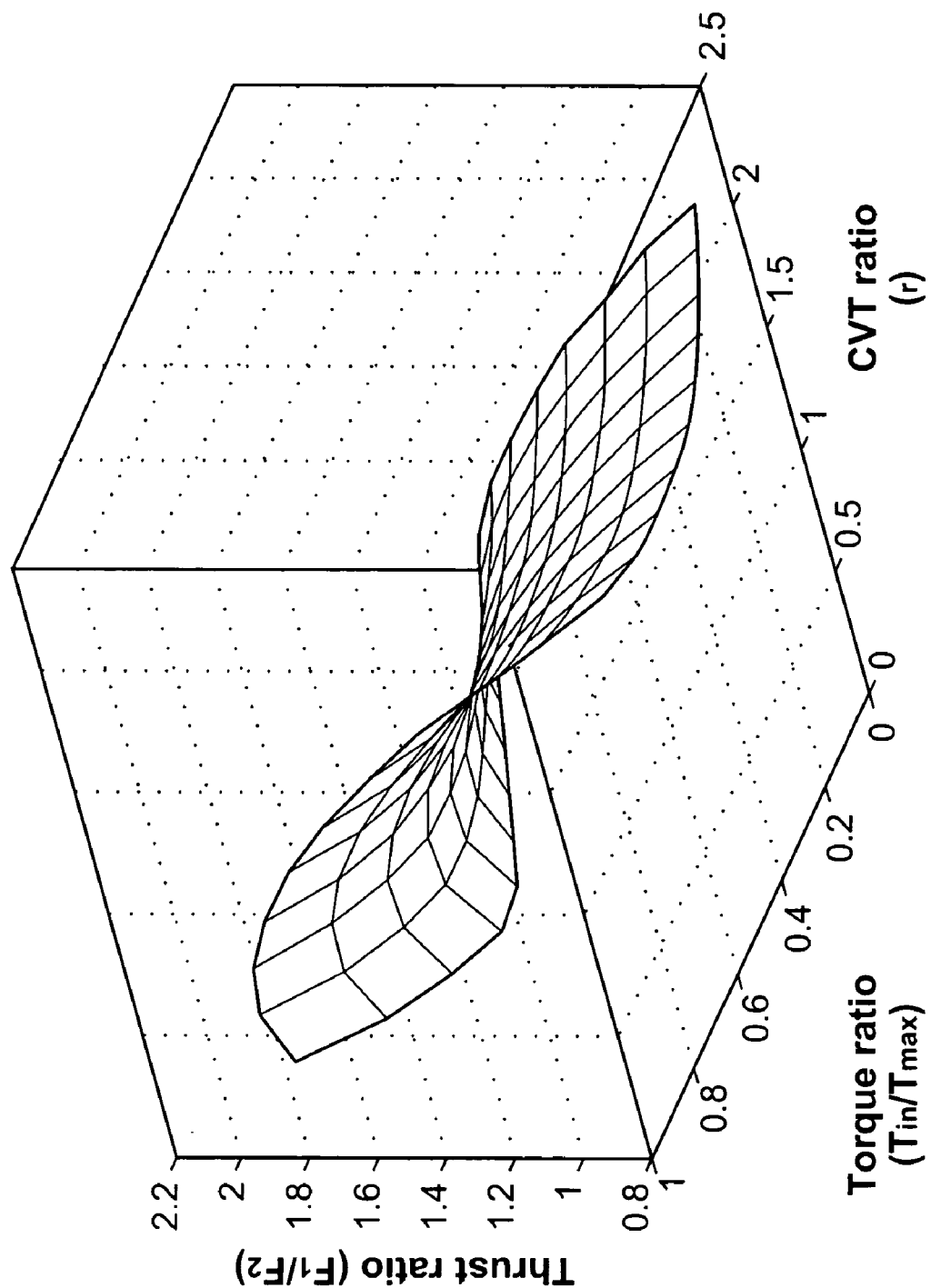
FIG. 20 is theoretical equilibrium map according to the present invention.

A 3-D map can be generated to illustrate the relation between these three parameters. FIG. 20 is an example of an equilibrium map for the CVT.

$A_1/A_2$ Ratio

Figure 21:
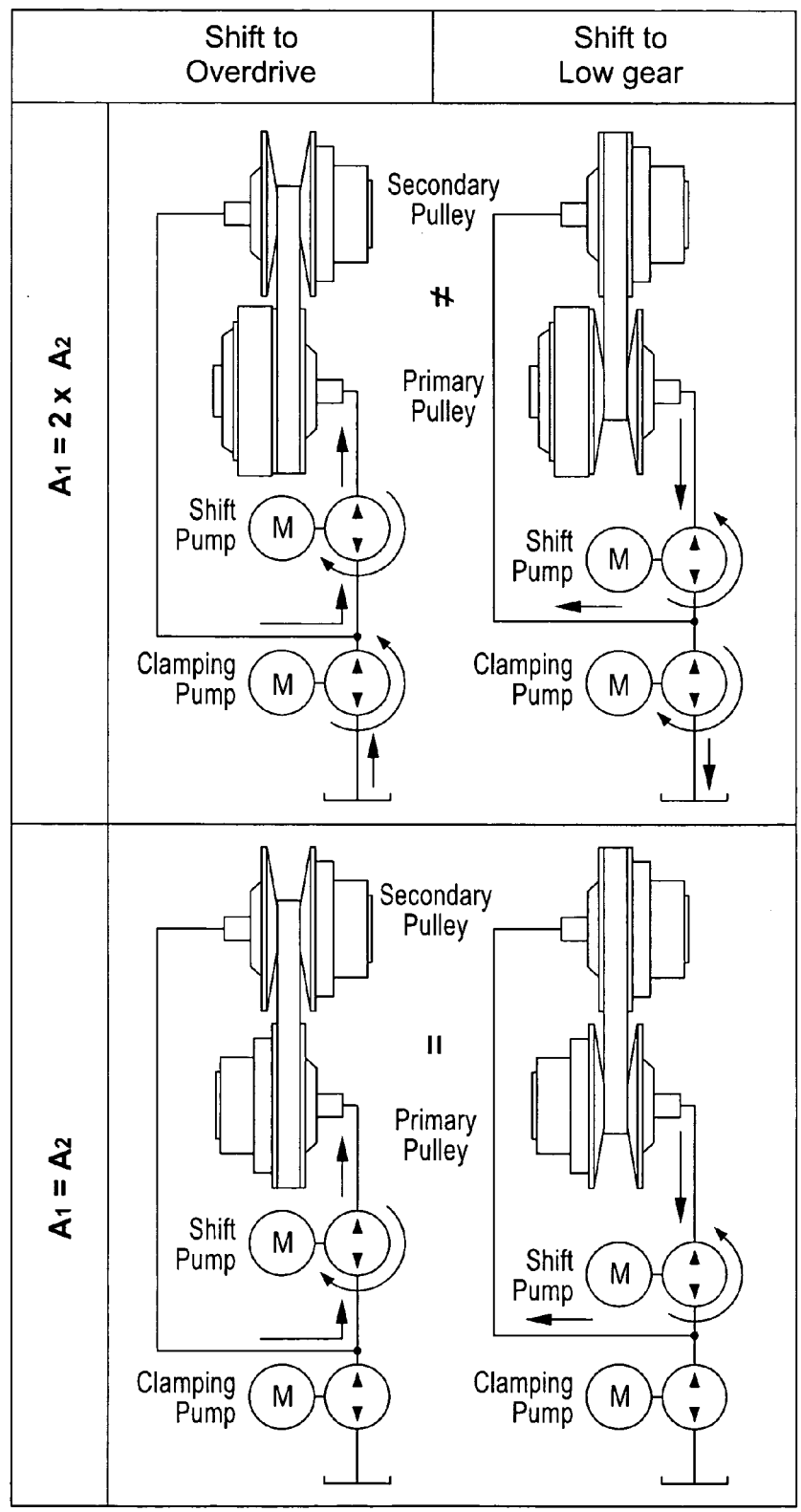
FIG. 21 is a series of diagrams illustrating the influence of cylinder design on clamping pressure.

As noted previously, the ratio of the two pulley piston areas is constrained by the thrust ratio needed to attain all possible ratios and even more, all possible shift speeds. In a conventional CVT, the ratio $A_1/A_2$ has to be about 2:1, because of the use of only one source of high pressure. As an example, in a Jatco 2L CVT used for tests, $A_1/A_2$ was measured and found to be equal to 2.14. The equilibrium map (FIG. 20) demonstrates this statement. In order to obtain a thrust ratio (Fax1/Fax2) of 2, with the primary pressure constrained to be no greater than the secondary pressure, the primary pulley piston area has to be greater than that of the secondary pulley by a factor of 2. On the other hand, when introducing the servo hydraulic control system, two sources of high pressure are available, and the piston areas do not have to be different for the CVT to attain all ratios. Furthermore, since the ratio servo pump creates differential pressures between the secondary and the primary, the pressure difference should be minimized in order to optimize its work. Also, when $A_1/A_2$ is different than 1:1, volumes of both pistons are different. This means that when the ratio servo pump moves fluid from one pulley to the other, in order to shift the transmission, fluid has to be pumped from or to the sump by the pressure servo pump. Thus a complex relationship between the ratio pump and the pressure pump has to be introduced in the control. On the other hand if $A_1/A_2$ is equal to 1, the pressure pump works against the leakage of the system in order to hold clamping pressure independently from the action of the ratio servo pump, whose role is to shift the transmission. These phenomena are illustrated in FIG. 21.

Leakage Flow Tests

Leakages are the primary source of control power draw when operating a CVT with a servo controlled hydraulic system. Leakage is defined as the hydraulic fluid flow to be supplied to a pulley cylinder in order to hold a constant pressure in the piston. Leakage flow is proportional to pressure and is inherent to the mechanical design of the transmission control.

Figure 22:
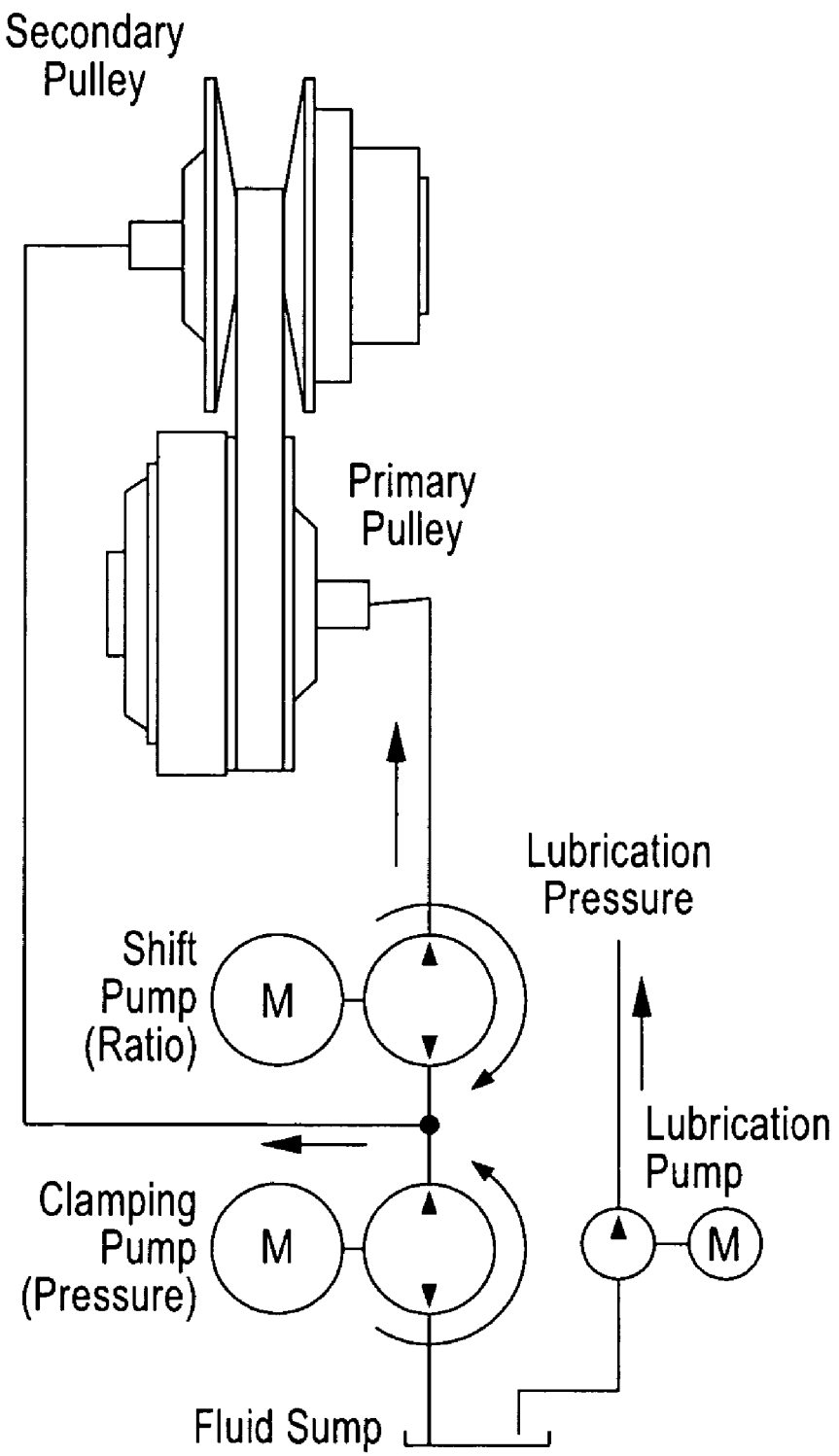
FIG. 22 is a schematic diagram illustrating pump rotational directions and flow orientations in a servo control mechanism according to the present invention corresponding to a positive P speed and a negative R. speed.

Test Conditions:

Both pressures were commanded to 200 PSI. The electric motor throttle was set to 14.6% and the output speed kept at 800 RPM. During this time the geometric ratio, the input and output speeds of the CVT and the throttle command are kept constant. Note that for both motors, positive speed represents counter clockwise rotation. FIG. 22 illustrates the fluid flow direction that corresponds to a positive P speed and negative R speed. This happens when both pumps are supplying fluid to their respective cylinder, which is the case during this leak test.

By averaging the servo pumps speeds over time, the leak flow of both secondary and primary hydraulic circuits can be determined. The assumption is made that the pumps experience no internal leakage, and that for every revolution they displace 1.07 cc.

We found that leakages were on the order of 8 times higher in a conventional CVT than in a servo controlled CVT (equivalent to a 5 L) according to the invention. This significant difference results from the design of each of these CVTs. A conventional CVT with a stock control system requires leaks for system response. On the other hand, the CVT of the present invention was designed for the servo hydraulic control, where leaks are not required and can be minimized in the design. The control power required for the servo hydraulic system is proportional to leakage flow, and in the ideal case of a zero-leak CVT, it would be reduced to the power required to move fluid from one piston to the other in order to shift the transmission. The leakage flows observed in the SC-CVT tests indicate a very low control power draw.

Power Draw Measurement Tests

In order to evaluate the power draw of the servo hydraulic control system, two series of tests were performed:

1. Steady state tests in which CVT ratio and secondary pressure are held constant.

2. Shifting tests, where Secondary pressure is held constant while the ratio is commanded with a step input.

These two series of tests illustrate the different operations of a CVT and provide significant data to understand the energy required by the control system in a CVT equipped with the servo hydraulic system according to the present invention.

Steady State Tests

Steady state tests are used to determine the power required by the CVT to hold secondary pressure and ratio constant at different operating points.

Test Conditions:

The CVT ratio is held at 2.2, 1.0 and 0.7.

The secondary pressure is commanded to 10, 15, 20, 25, 30, 35 and 40 bars.

During these tests the measurements of current to the servomotors amplifiers are used with the voltage of the high voltage bus data to calculate the electrical power drawn by both servo pumps. The pump speed and pressure are used to compute the hydraulic power for each pump.

In the calculation of the hydraulic power, the assumption is made that leakage flow exits in the system at 0 psig and that the internal leakage of the pumps is null.

It was found that the electrical current used by the pressure servo pump amplifier grows with time because the pressure command increases whereas the current to the ratio amplifier is almost null. As predicted previously by the leakage results, the servo controlled CVT used significantly less power than a conventional controlled CVT, even thought the servo controlled CVT was designed for more than twice the power/torque capacity. The reason for this energy usage improvement comes from the mechanical design and components used in the two CVTs. Leak passages were part of the design of the conventional CVT cylinders, whereas the servo controlled CVT cylinders were designed with tight adjustments and no leakage holes.

Shifting Tests

Test Conditions:

For the shifting tests, the electric motor throttle was commanded to regulate the input speed to 800 RPM.

CVT shifting is directly dependent upon the fluid volume displaced from one piston to the other. The time to shift from overdrive to low gear is equal to the time it takes to shift the other way; and also the ratio response to a step input is not linear but slightly curved. This second point is due to the nonlinear relationship between ratio and running radii illustrated by equations (16) and (17). The ratio is constrained by the position of the pulleys which depends on the fluid displaced, dictated by the maximum flow of the servo pump (maximum speed of the ratio motor multiplied by pump displacement).

In the servo controlled CVT test configuration, the pulleys movable sheaves could translate 24.81 mm and the effective pressure area was 175 $cm^2$, so the volume of fluid to be moved to fully shift the CVT was equal to 434 cc. As the pump has a displacement of 1.07 cc/rev and the maximum speed of the servomotor is about 6000 RPM depending on the voltage of the high voltage bus, the servo controlled should execute a full shift in 4 seconds. A close examination of a full shift indicated that the maximum speed reached by the ratio motor is about 6200 RPM, resulting in a CVT full shift in 3.8 seconds. Integrating the ratio motor speed data over the time of the full shift, the volume displaced was equal to 422 cc. The 8 cc difference between this measurement and the theoretical number can certainly be explained by the leakages in the pump and of the pistons as well as by the experimental error in the data.

Regarding the power necessary to shift the transmission, we observed the current used by the ratio amplifier. By averaging current to the amplifier and voltage of the high voltage bus during the execution of the full shift to low gear, the power used by the ratio servo pump amplifier was found to be 372 watts (for less than 4 seconds). The shifting speed of the CVT equipped with the servo hydraulic control system was found to be too slow for operating in a conventional powertrain using only an internal combustion engine. But it is sufficient for use in a parallel hybrid powertrain because instantaneous power can be supplied by the electric motor while the CVT is commanded to shift. Note that to improve the shifting performance of the servo controlled CVT, the maximum flow of the ratio servo pump has to be increased. This can be easily done, if needed, by using a higher displacement pump or a faster motor.

Figure 19:
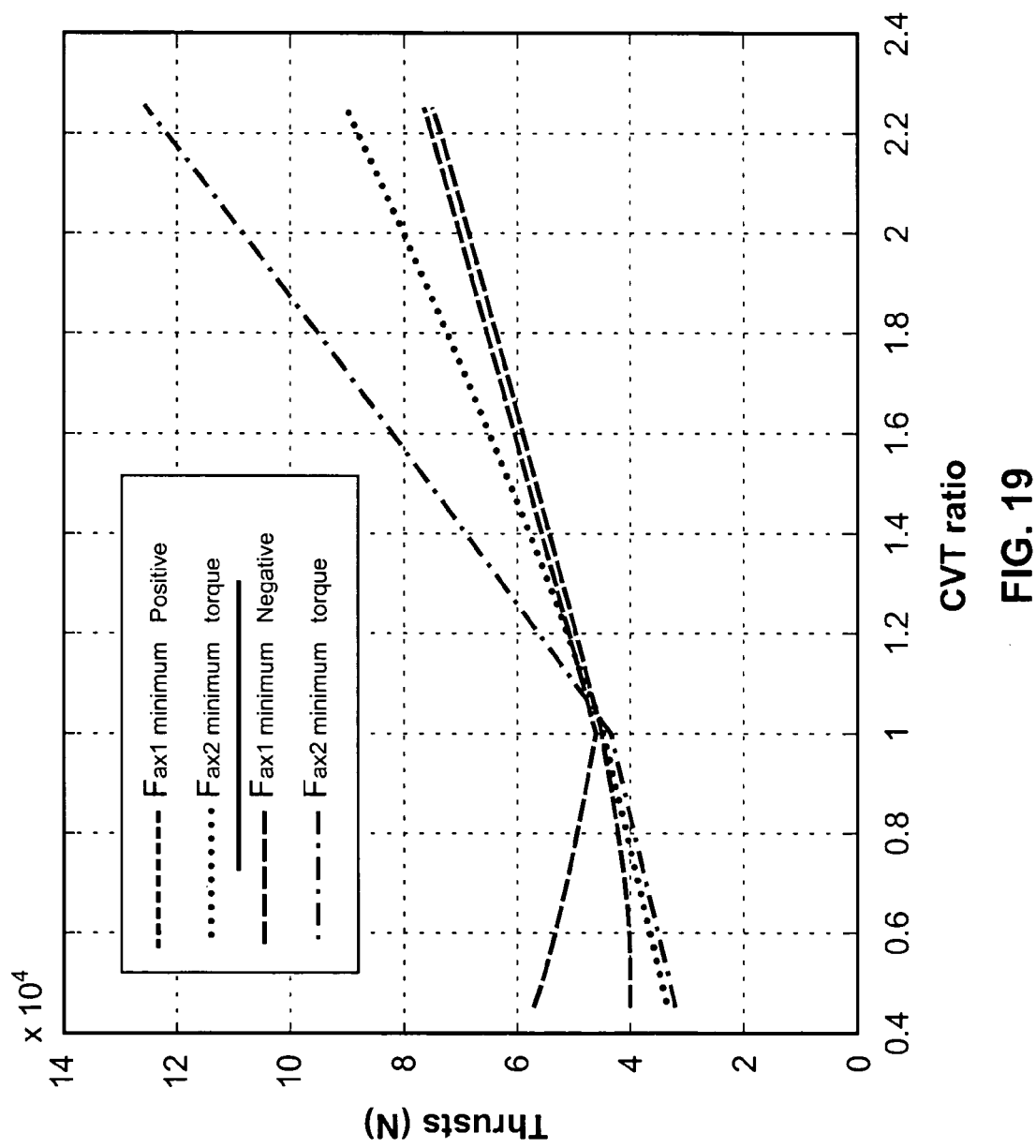
FIG. 19 is a graph illustrating pulley thrust at slip limit showing that A clamping force as a function of ratio is non-monotonic.

Observing the pistons pressures while the servo controlled CVT is shifting, we noted a drop of the primary pressure when the CVT reaches low gear. The primary movable sheave reached its low gear mechanical limit but the inertia of the servo pump kept driving fluid out of the primary piston. We also observed that the ratio pump speed changes direction to build the primary pressure back. This behavior is specific to shifts toward the lowest possible gear. In order to shift to overdrive, fluid has to be moved from the secondary piston to the primary. So when the primary movable sheave reaches the overdrive mechanical stop, the primary pressure observes a pressure peak. In this generation of control algorithm, the torque transmissible through the CVT is regulated using the pressure or clamping servo pump and the ratio close loop regulation outputs a command for the ratio servo pump. Therefore, the primary pressure is not taken into consideration by either regulator, which could be dangerous if the axial force on the primary pulley was getting lower than the minimum presented on FIG. 19. This is difficult to evaluate even though the piston pressure is known because of the dynamic effect and the friction introduced by shifting the movable sheaves.

One solution to this problem is to operate the CVT by controlling both pressures with the two servo pumps and using the equilibrium map to regulate ratio. This will allow for keeping both pressures above their minimums and using their difference to shift the transmission. The first step in implementing such a control algorithm is to determine experimentally the equilibrium map previously discussed.

Experimental Equilibrium Map Determination

In order to experimentally verify the theoretical equilibrium map previously described, the SC-CVT was run for various combination of pressures, ratio and torque. Each steady state or equilibrium point was then averaged over its period of steady-state operation and analyzed. FIG. 23 presents some of the data obtained.

The torque input (or torque applied by the electric motor) is evaluated from the maximum torque map provided by the motor manufacturer and the throttle command. This method is not accurate enough. Ideally, a torque sensor should be positioned between the motor and the CVT input shaft. Due to this inaccurate evaluation of the torque input, the torque ratio term should be considered with some uncertainty. Nevertheless, these results still show the general shape of the equilibrium map. Moreover, by observing FIG. 20, the thrust ratio appears to be more sensitive to the transmission ratio than it is to torque ratio. Variations of thrust ratio are more important when varying the transmission ratio than it is when changing the torque ratio.

Figure 24:
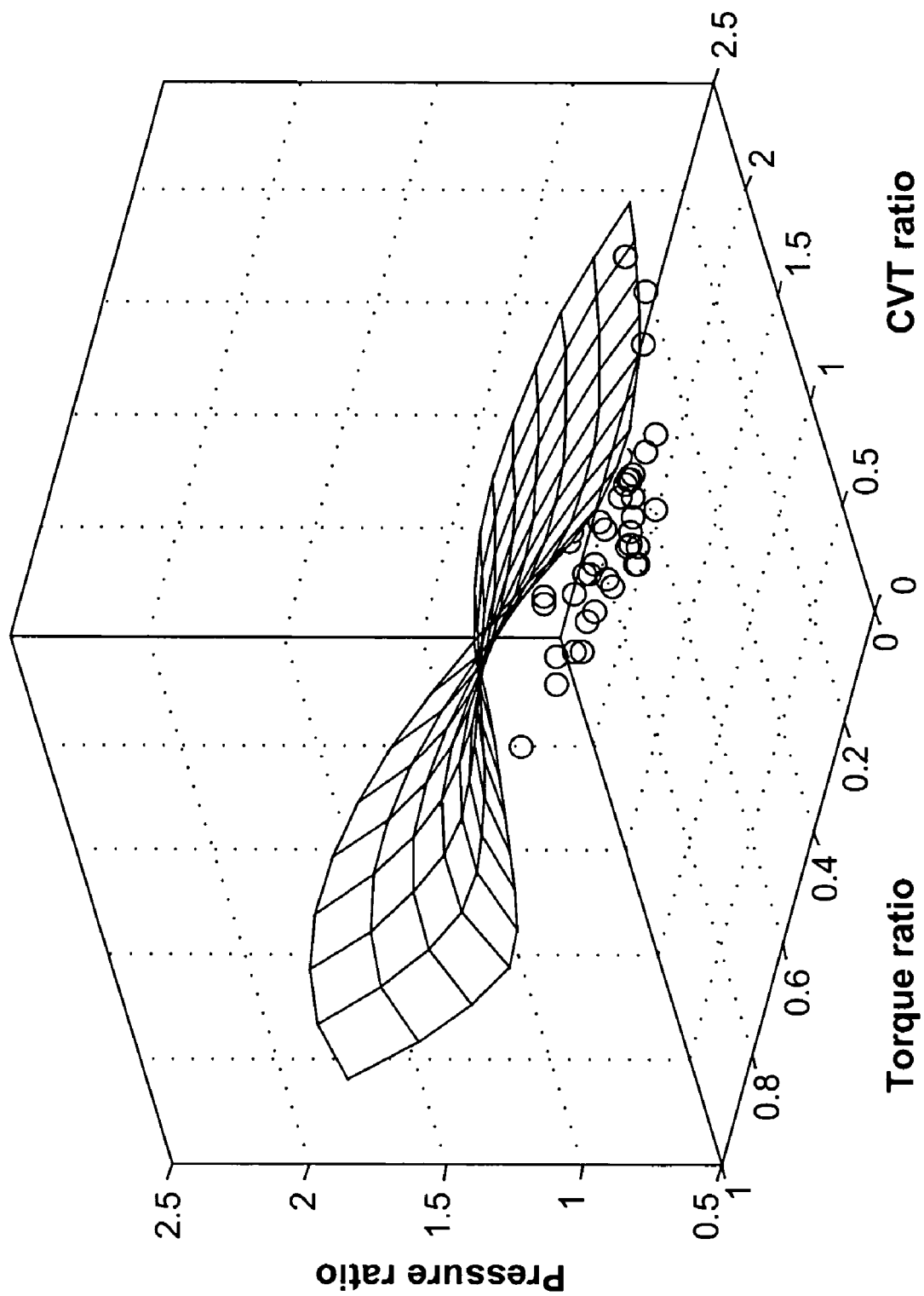
FIG. 24 is a graph showing illustrating experimental equilibrium data points from FIG. 23 and the theoretical equilibrium map from FIG. 20.
Figure 25:
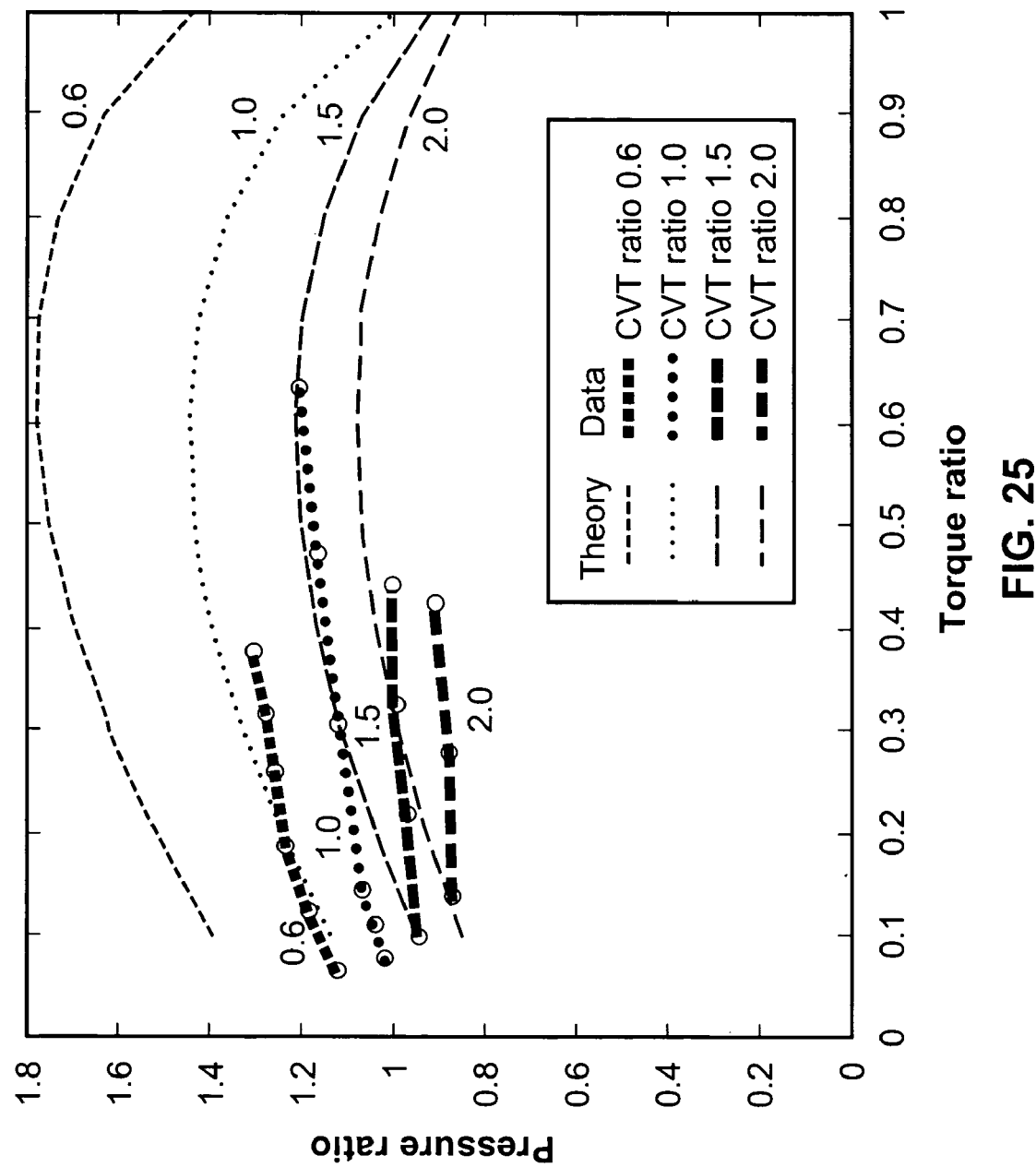
FIG. 25 is a graph showing equilibrium data points on the torque ratio-thrust ratio plane for different transmission ratios along with theoretical results for the same transmission.

FIG. 24 shows the experimental data points and the theoretical equilibrium map. Note that the data points do not appear to match the calculated map. The data follow the same trend as the theoretical map along the CVT ratio axis, but the slope appears to be more constant. Along the torque ratio axis, the experimental data do not experience a maximum as predicted by the theory. FIG. 25 shows the experimental results on the torque ratio—thrust ratio plane for different transmission ratio, along with the results of the theory for the same transmission ratio.

There are several ways to explain the significant difference observed between theoretical predictions and experimental results. As noted previously, the electric motor torque is not measured, but evaluated. This results in uncertainty in the torque ratio term. The thrust ratio is calculated using the fluid pressure measurements from both cylinders; this considers the effect of static pressure in each cylinder but neglects the effect of dynamic pressure (centrifugal pressure) and the action of other forces such as friction. Also, the theoretical predictions are based on the assumptions that the Eytelwein formula dictates exactly the force distribution in a pulley system and that in the case of conical pulley, no other phenomenon is taking place. The compressive forces in a v-belt are measured along the travel of the belt and the experimental results show a force distribution significantly different from the one predicted by Eytelwein. The coefficient of friction $\mu$ is also of great importance; small variations in $\mu$ result in significant changes in the shape of the theoretical equilibrium map. For the previous calculations, $\mu$ has been considered constant and equal to 0.09 but other researchers have suggested that the coefficient of friction varies with the speed ratio of the transmission.

The experimental data show linear growths in both dimensions (transmission ratio, torque ratio). Therefore the equilibrium map could be approximated to a plane.

A best-fit plane was computed from the experimental data. FIG. 26 shows the different phases of the computation from the data points to the final best-fit plane.

Pressure-Based Control Algorithm

The pressure-based control approach is based on the measurement of the cylinders pressure when the CVT is commanded to shift. With the previous control algorithm, shifting command is translated into a required torque to be applied by the ratio servomotor by moving fluid between the pulley cylinders and creating a pressure differential. This algorithm regulates the torque transmissible through the CVT by modulating the secondary pressure, but neglects the primary pressure for this purpose. To shift toward overdrive, the primary pressure must be raised by pumping fluid to the primary pulley; and to shift toward low gear, the primary pressure is lowered by pumping fluid out of the primary pulley. The point of the pressure-based control algorithm is to use the pressures to control the two states of the CVT (transmission ratio and torque transmissible). This translates into two requirements. First, the transmissible torque is evaluated separately for each pulley using the pulley's pressure, and the smaller of the two results is conserved. Second, to shift toward overdrive, the primary pressure is raised; but to shift toward low gear, the secondary pressure is raised instead of lowering the primary pressure. The pressure-based control is a more conservative algorithm that considers the axial force in each pulley equal to the static pressure in that pulley cylinder times the active area of the cylinder. As noted previously, other forces such as centrifugal pressure, friction or even the dynamic effect of shifting speed must be evaluated to determine the actual axial thrust of each pulley. To operate the CVT by controlling the static pressure of the cylinders, the equilibrium map of the controlled transmission must be known. The measured equilibrium map will be used to determine the ratio needed between the primary and secondary pressures in order to hold the transmission ratio constant.

Figure 27:
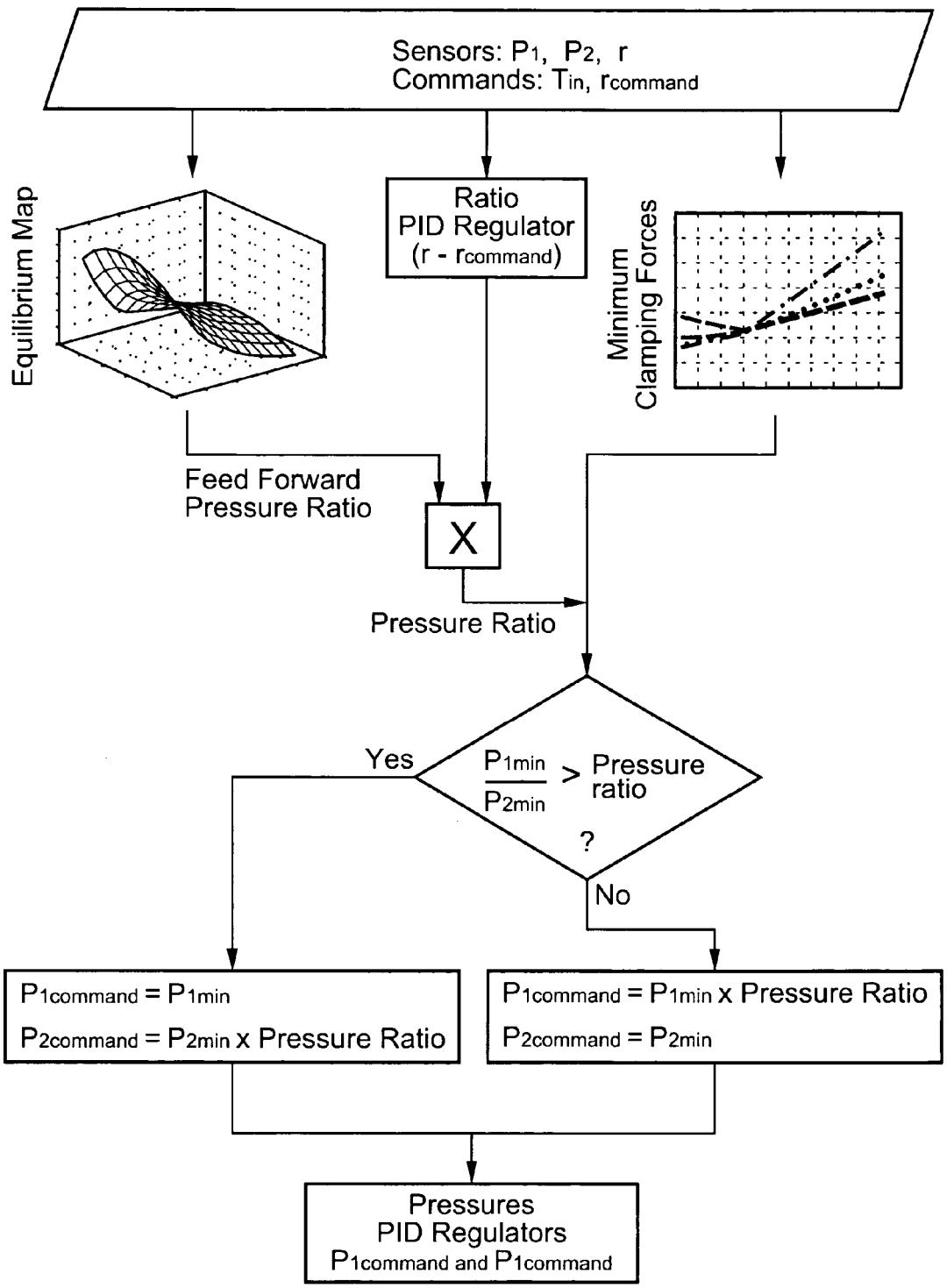
FIG. 27 is a flow diagram of an embodiment of a pressure-based control algorithm according to the present invention.

The main steps of the pressure-based control algorithm are illustrated in FIG. 27.

From the experimentally determined equilibrium map, a feed forward value for the pressure ratio is determined. In parallel, the controller computes a closed loop regulation on the transmission ratio error. The feed forward pressure ratio is then multiplied with the output of the transmission ratio regulator yielding the pressure ratio to be commanded. Using the minimum pressure calculation presented on FIG. 19, the controller derives the minimum pressure to command on each piston considering the operating conditions. Finally, the pistons' pressures are commanded in accordance with the pressure ratio computed, as well as to ensure that both pressures are greater than or equal to their minima.

Figure 28:
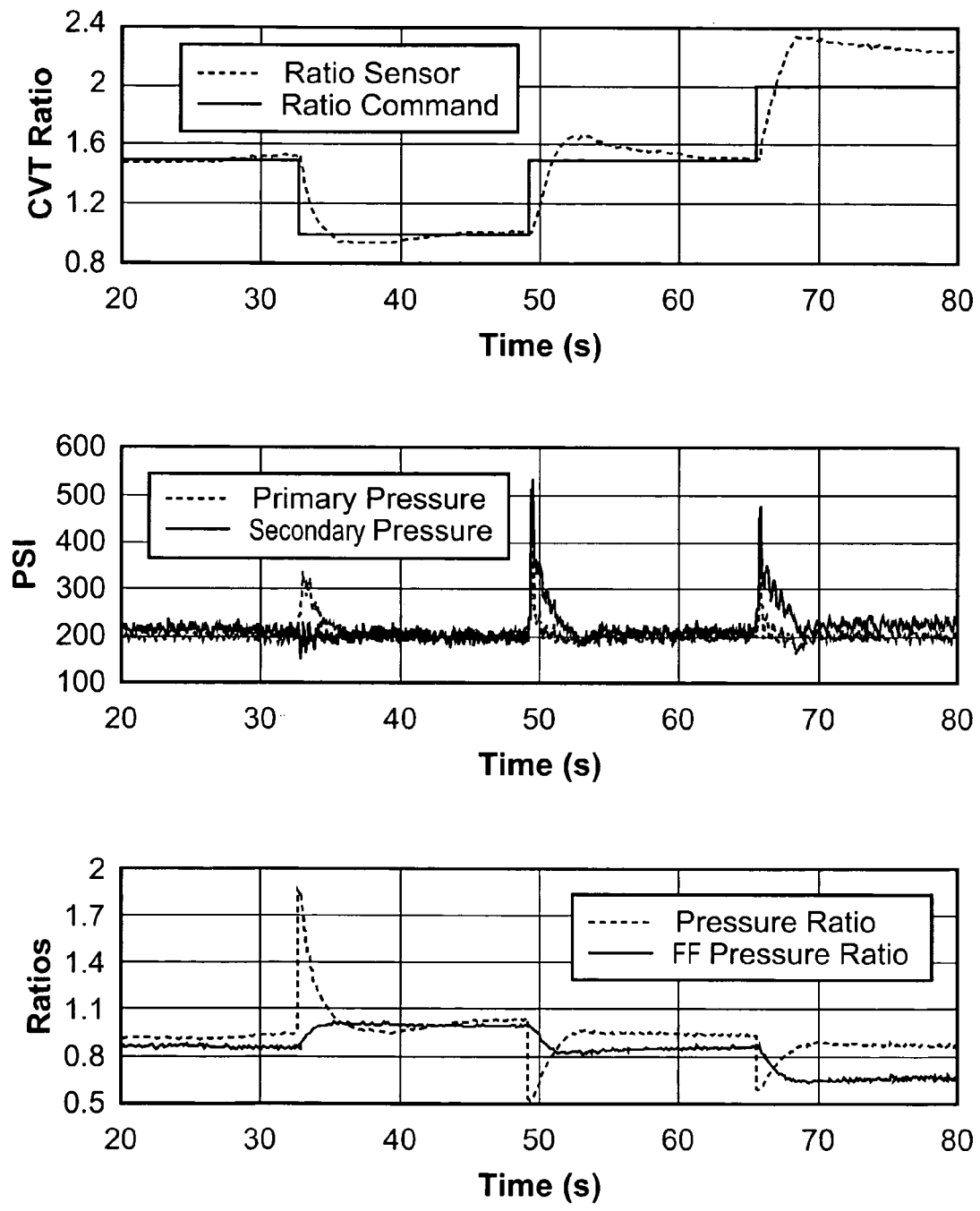
FIG. 28 is a series of graphs illustrating test results for pressure based control testing.

This pressure-based control algorithm was programmed into the CVTC and tested on the dynamometer setup. FIG. 28 presents some of the results of this testing.

The first thing to observe is that, instead of only using the primary pressure to regulate transmission ratio, either pressure can be raised above its minimum in order to shift.

Figure 29:
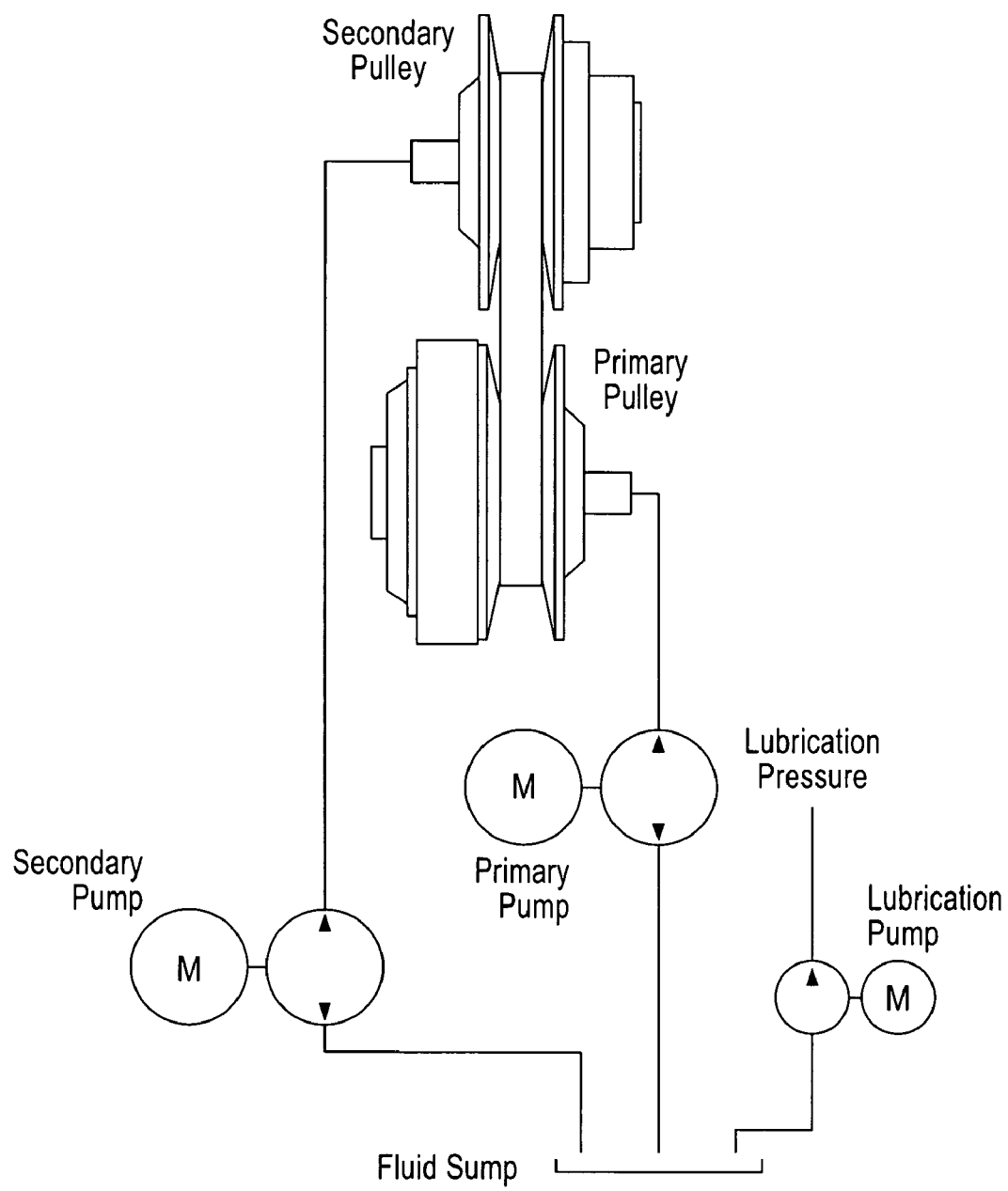
FIG. 29 is a schematic diagram of an independent servo pump control system according to the present invention.

Note that both pressures are kept above a minimum of 200 PSI, even when shifting the transmission toward low gear. By looking closely at the pressure plot in FIG. 28, one can notice perturbations on the secondary pressure when the primary pressure is raised in order to shift toward low gear. Similar perturbing phenomena are observed on the primary pressure when the secondary pressure is raised in order to shift toward overdrive. This problem is inherent to the servo hydraulic control system scheme; the ratio servo pump is dependant upon the operation of the pressure servo pump. Therefore, an arrangement such as the one shown in FIG. 29 would be better suited to the pressure based control algorithm, as it avoids fluid dependency and perturbation phenomenon between the primary and secondary cylinders. The testing performed indicates that the pressure-based control algorithm can be used successfully to control a CVT, but also shows that the approximation of the equilibrium map by a plane is not sufficiently precise. The accuracy of the control of the transmission ratio depends on the precision of the map used for the feed forward pressure ratio. A good solution to this problem would be to use a learning controller that would build the equilibrium map while operating the CVT. This seems to be a good application for neural networks.

Macro Slip Experience

During normal operation of the CVT, the commanded torque is kept lower than the maximum torque transmissible through the transmission by a torque-clipping algorithm. The role of the torque-clipping algorithm is to throttle back the powertrain if the clamping pressure becomes insufficient to transmit the torque requested by the driver. Even with this algorithm working properly, macro slip of the chain was observed while testing the transmission on the dynamometer. FIG. 30 illustrates an occurrence of macro slip, the bottom plot shows the transmission ratio (lower solid line) read from the sheave position measurement (geometric ratio) and the calculated ratio (upper dashed line) using input and output speed signals (speed ratio). At time 83 seconds, the input speed increases whereas the output speed decreases; this is typical of a slip under positive torque. The input and output are decoupled for an instant. This allows the motor to accelerate the input while the load decelerates the output.

This unexpected slip of the chain raised questions about the reliability of the torque command estimation. As discussed previously, the electric motor torque is considered equal to the throttle commanded (in %) times the maximum torque for the given rotational speed. Looking at the test data at the time of the slip, the electric motor torque commanded was 140 Nm, but the dynamometer measured 180 Nm. The transmission ratio was 1:1; therefore the output torque cannot be greater than the torque input. In fact the torque output should be in the order of 3 to 5% less than the input torque due to the SC-CVT transmission efficiency. It appears here that the electric motor was producing almost 30% more torque than expected. There are several possible explanations for this torque difference:

1. A linear relationship between the throttle and the torque was assumed;

2. The communication of the throttle from the CVT Controller to the motor inverter is made through analog channels; electromagnetic noise and ground reference offset could cause problems;

3. The maximum torque line of the electric motor provided by the motor manufacturer is given for a high voltage bus at 336 volts, but the battery pack voltage used to supply power to the electric motor varies between 400 volts and 260 volts depending on the load applied and the battery state of charge (SOC).

CONCLUSIONS

CVTs have many advantages over discrete geared transmissions, and have already proven the benefits of their use in conventional automotive powertrain. Two types of CVTs appear to be suitable for cars and trucks: toroidal traction drive and belt/chain drive. Toroidal CVTs still remain at a development stage, and numerous issues have to be addressed before they can be placed on the market. On the other hand, belt CVTs are already found in many commercial vehicles. The recent introduction of chains to replace the commonly used VDT metal push belt can extend the use of belt type CVTs to full size sedans and sport utility vehicles (SUV).

The SC-CVT is a good illustration of belt type CVT development; this transmission using a chain has been designed for a full size SUV. The SC-CVT has met its design criteria for high power and torque capacities and has shown great potential. Testing performed in the truck demonstrated the success of this project. The servo hydraulic system implemented to control the SC-CVT has been functioning to expectations, and the test vehicle exhibited good drivability throughout the testing. A theoretical study of CVT behavior was conducted in order to better understand the control requirements of the SC-CVT. Based on the theory of Eytelwein, a series of calculations were presented to characterize the relationship between torque input, clamping forces and transmission ratio. It should be appreciated that inertia is an important consideration in that the ratio rate can set the torque, but the torque that the ratio rate sets is dependent on the inertia of the engine and the inertia of the output or the inertia of the car. In other words, for a given ratio rate the torque that the CVT transmits is a function of the inertias on the input and output.

The servo hydraulic control scheme used for the SC-CVT has been shown to work very well. This scheme uses a control algorithm that regulates clamping pressure using the pressure servo pump, and closes the loop on ratio by commanding the ratio servo pump. This version of control algorithm resulted in safe operation of the CVT, though the primary pressure can become lower than the static theoretical minimum pressure.

The SC-CVT, due to low internal leakage, has been shown to require very low control power using servo hydraulic control. The power consumed by the two servomotors is below 100 watts for most of the steady state operating conditions. Even when compared, for various steady states of pressure and ratio, with a production CVT modified to use the same servo hydraulic control system, the servomotors of the SC-CVT used 5 times less electrical power than the one installed on the conventional CVT. This demonstrates the benefits of designing a transmission specifically for the servo hydraulic control system. One of the main differences between the SC-CVT and regular production CVTs is the use of equal area pistons for the primary and secondary pulleys. This design modification brings many advantages: it reduces control complexity by avoiding clamping pressure perturbation when shifting; it lowers the average ratio servo pump energy usage by operating naturally closer to the equilibrium map; and because parts are identical for both pulleys, it decreases manufacturing cost.

A control algorithm based on regulating pressures was developed using experimental equilibrium map data and tested to control the SC-CVT. Pressure-based control has shown promising results in terms of feasibility, but could benefit from a more adapted hydraulic control scheme where each servo pump supplies a pulley piston independently from the other one. It was also found that a learning controller could be implemented to establish the precise equilibrium map of the controlled CVT.

The test results presented above lead to the following observations for improvements that can be pursued:

1. In order to control clamping pressure more closely, the input torque to the CVT should be accurately known. This requires either a measurement of motor output torque or a reliable map of the maximum EM torque envelop as a function of bus voltage.

2. Components used for the servo hydraulic control system should be sized in accordance to their actual operation requirements. Using the results of the power draw testing, amplifiers could be significantly downsized, the pressure servo pump could use a slower motor or lower displacement pump, whereas the ratio servo pump, depending on the desired shift speed, could use a higher displacement pump.

3. Further study of the possible occurrence of macro-slip should be performed when better knowledge of the EM torque is available to the control algorithm. Changes in the algorithm should then be considered if macro-slip occurs. Additionally, slowing down the ratio motor when approaching mechanical limits or increasing the secondary pressure command while shifting towards low gear should be considered.

4. The mechanical efficiency of the SC-CVT should be measured. This would require accurate torque and speed measurements on both input and output of the transmission or the construction of a special four-quadrant dynamometer.

5. Finally, measurement of chain speed in addition to pulleys speeds could lead to research on micro slip of the chain and on clamping pressure scheduling.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for.

TABLE 1

SC-CVT Parameters

| Parameter | Value | Unit | Description |
|---|---|---|---|
| CD | 250 | mm | Pulleys' centre to centre distance |
| A1, A2 | 175 | cm² | Effective pulley pressure area |
| RedEM | 2.4545 | | Gear ratio between EM and input pulley |
| Rmax | 2.2556 | | Maximum transmission ratio (Low Gear) |
| Rmin | 0.4433 | | Minimum transmission ratio (OD) |
| β | 11 | ° | Sheave angle |
| R1max, R2max | 114.7 | mm | Maximum running radii |
| R1min, R2min | 50.85 | mm | Minimum running radii |
| Lchain | 1036.5 | mm | Chain length when wrapped around the pulleys |
| Pitch | 13.65 | mm | Chain pitch |
| Npitch | 75 | | Numbers of pitches |
| Wchain | 44.4 | mm | Chain width |

What is claimed is:

1. An apparatus for controlling the operation of a continuously variable transmission (CVT) having hydraulically operated primary and secondary pulleys with varying effective diameters, and a drive belt coupling the primary pulley to the secondary pulley, comprising:
   a programmable controller; and
   means associated with said controller for mapping rate of change of ratio to clamping pressure and/or differential pressure between said pulleys in said CVT, and for dynamically controlling acceleration and deceleration of said vehicle from rate of change of ratio;
   a primary pump fluidly connected to said primary pulley;
   a secondary pump fluidly connected to said secondary pulley;
   wherein said primary and secondary pumps are not fluidly connected; and
   a torque clipping algorithm is used to throttle back the torque to the primary pulley when the clamping pressure is insufficient to prevent slipping of said drive belt.

2. An apparatus for controlling the rate of change ratio in a continuously variable transmission (CVT) having hydraulically operated primary and secondary pulleys with varying effective diameters, and a drive belt coupling the primary pulley to the secondary pulley, comprising:
   a programmable controller;
   programming associated with said controller for mapping rate of change of ratio to clamping pressure and/or differential pressure between said pulleys in said CVT, and for dynamically controlling acceleration and deceleration of said vehicle from rate of change of ratio;
   a pressure pump fluidly connected to said secondary pulley;
   wherein said pressure pump has a bypass control valve that opens below a predetermined pressure; and
   a shift pump fluidly connected to said primary pulley;
   wherein said shift pump is fluidly connected to said pressure pump.

3. An apparatus as recited in claim 2, further comprising a torque clipping algorithm is used to throttle back the torque to the primary pulley when the clamping pressure is insufficient to prevent slipping of said drive belt.

4. An apparatus for controlling the operation of a continuously variable transmission (CVT) having hydraulically operated primary and secondary pulleys with varying effective diameters, and a drive belt coupling the primary pulley to the secondary pulley, comprising:

a programmable controller;
an algorithm or map associated with said controller, wherein said algorithm or map determines clamping pressure and/or differential pressure level between said pulleys in said CVT for achieving a desired rate of change in ratio in said CVT for dynamically controlling acceleration and deceleration of said vehicle;
a pressure pump fluidly connected to said secondary pulley;
a shift pump fluidly connected to said primary pulley; and
a bypass control valve fluidly connected to said pressure pump that opens below a predetermined pressure.
wherein said shift pump is fluidly connected to said pressure pump; and
wherein the pressure on said secondary pulley is raised instead of lowering the pressure on said primary pulley when said CVT is shifted toward low gear.

5. An apparatus for optimizing the operation of a continuously variable transmission (CVT), comprising:
 (a) a control computer; and
 (b) programming associated with said control computer for
  (i) accessing a map of the relationship between pressure of a CVT and rate of change of ratio to transmit a given amount of torque,
  (ii) controlling primary and second pulley pressure of the CVT to achieve a commanded clamping pressure for commanded torque and ratio rate based on said map;
 wherein acceleration and deceleration of said vehicle is dynamically controlled by controlling ratio of change of ratio; and,
  (iii) a torque clipping algorithm adapted to throttle back the torque to the primary pulley when the clamping pressure is insufficient to prevent slippage in the CVT.

6. An apparatus as recited in claim 5, further comprising a hydraulic servo control system adapted for control of said primary and secondary pulley pressure in response to said control computer.

7. An apparatus for optimizing the operation of a continuously variable transmission (CVT), comprising:
 (a) a control computer; and
 (b) programming associated with said control computer for carrying out the operations of controlling primary and secondary pulley pressures of the CVT to control the ratio rate and/or ratio and clamping pressure of the CVT based on an equilibrium ratio map of the CVT and the pressure relationship between the ratio rate of the CVT and the distance between the point corresponding to the current states of the CVT and the projection of this point onto said equilibrium ratio map;
 wherein acceleration and deceleration of said vehicle is dynamically controlled by controlling rate of change of ratio; and
 wherein a torque clipping algorithm is used to throttle back the torque to the primary pulley when the clamping pressure is insufficient to prevent slippage in the CVT.

8. An apparatus as recited in claim 7, further comprising a hydraulic servo control system adapted for control of said primary and second pulley pressure in response to said control computer.

9. An apparatus for controlling the operating of a continuously variable transmission (CVT) having hydraulically operated primary and secondary pulleys with varying effective diameters, and a drive belt coupling the primary pulley to the secondary pulley, comprising:
 a servo control system;
 said servo control system configured to control clamping pressure and differential pressure between said primary and secondary pulleys in the CVT;
 a control computer;
 programming associated with said control computer for controlling said servo j system to achieve commanded clamping pressure and/or differential pressure between the primary and secondary pulleys based on a mapping of rate of change of ratio of said CVT to said clamping pressure and/or differential pressure between said pulleys;
 wherein acceleration and deceleration of said vehicle is dynamically controlled by controlling ratio of change of ratio;
 wherein the pressure on said secondary pulley is raised instead of lowering the pressure on said primary pulley when said CVT is shifted toward low gear; and
 wherein a torque clipping algorithm is used to throttle back the torque to said primary pulley when the clamping pressure is insufficient to prevent slipping of said drive belt.

10. A hybrid electric vehicle, comprising:
 a continuously variable transmission (CVT):
 said CVT having hydraulically operated primary and secondary pulleys with varying effective diameters;
 a drive belt coupling the primary pulley to the secondary pulley;
 a primary pump fluidly connected to said primary pulley;
 a secondary pump fluidly connected to said secondary pulley;
 wherein said primary and secondary pumps are not fluidly connected;
 an internal combustion engine coupled to the CVT;
 an electric motor coupled to the output of the internal combustion engine;
 a system controller configured to operate said motor simultaneously with said engine and apply motor torque to said engine output to maintain engine power or torque output substantially along a predetermined operating line;
 said system controller further configured to control rate of change of ratio of said continuously variable transmission;
 wherein said system controller dynamically varies acceleration and deceleration of said vehicle by varying motor torque and rate of change of ratio of said continuously variable transmission;
 means associated with said controller for mapping rate of change of ratio to clamping pressure and/or differential pressure between said pulleys in said CVT; and
 a torque clipping algorithm used to throttle back the torque to said primary pulley when the clamping pressure is insufficient to prevent slipping of said drive belt.

11. A hybrid electric vehicle, comprising:
 a continuously variable transmission (CVT);
 said CVT having hydraulically operated primary and secondary pulleys with varying effective diameters;
 a drive belt coupling the primary pulley to the secondary pulley;
 a pressure pump fluidly connected to said secondary pulley;
 wherein said pressure pump has a bypass control valve that opens at low pressures;
 a shift pump fluidly connected to said primary pulley;

wherein said shift pump is fluidly connected to said pressure pump;
an internal combustion engine coupled to the CVT;
an electric motor coupled to the output of the internal combustion engine;
a system controller configured to operate said motor simultaneously with said engine and apply motor torque to said engine output to maintain engine power or torque output substantially along a predetermined operating line;
said system controller further configured to control rate of change of ratio of said continuously variable transmission;
wherein said system controller dynamically varies acceleration and deceleration of said vehicle by varying motor torque and rate of change of ratio of said continuously variable transmission; and
programming associated with said system controller for mapping rate of change of ratio to clamping pressure and/or differential pressure between pulleys in said CVT.

12. A hybrid electric vehicle as recited in claim 11, further comprising a torque clipping algorithm is used to throttle back the torque to the primary pulley when the clamping pressure is insufficient to prevent slipping of said drive belt.

13. A hybrid electric vehicle, comprising:
a continuously variable transmission (CVT);
said CVT having hydraulically operated primary and secondary pulleys with varying effective diameters;
a drive belt coupling the primary pulley to the secondary pulley;
a pressure pump fluidly connected to said secondary pulley;
a shift pump fluidly connected to said primary pulley;
wherein said shift pump is fluidly connected to said pressure pump;
wherein the pressure on said secondary pulley is raised instead of lowering the pressure on said primary pulley when said CVT is shifted toward low gear;
an internal combustion engine coupled to the CVT;
an electric motor coupled to the output of the internal combustion engine;
a system controller configured to operate said motor simultaneously with said engine and apply motor torque to said engine output to maintain engine power or torque output substantially along a predetermined operating line;
said system controller further configured to control rate of change of ratio of said continuously variable transmission;
wherein said system controller dynamically varies acceleration and deceleration of said vehicle by varying motor torque and rate of change of ratio of said continuously variable transmission;
an algorithm or map associated with said system controller, wherein said algorithm or map determines clamping pressure and/or differential pressure level between pulleys in said CVT for achieving a desired rate of change in ratio in said CVT; and
a bypass control valve fluidly connected to said pressure pump that opens below a predetermined pressure.

14. A hybrid electric vehicle, comprising:
a continuously variable transmission (CVT):
an internal combustion engine coupled to the CVT;
an electric motor coupled to the output of the internal combustion engine;
a system controller configured to operate said motor simultaneously with said engine and apply motor torque to said engine output to maintain engine power or torque output substantially along a predetermined operating line;
said system controller further configured to control rate of change of ratio of said continuously variable transmission;
wherein said system controller dynamically varies acceleration and deceleration of said vehicle by varying motor torque and rate of change of ratio of said continuously variable transmission; and
programming associated with said system controller computer for
(i) accessing a map of the relationship between pressure of a CVT and rate of change of ratio to transmit a given amount of torque, and
(ii) controlling primary and second pulley pressure of the CVT to achieve a commanded clamping pressure for commanded torque and ratio rate based on said map; and
(iii) a torque clipping algorithm adapted to throttle back the torque to the primary pulley when the clamping pressure is insufficient to prevent slippage in the CVT.

15. A hybrid electric vehicle as recited in claim 14, further comprising a hydraulic servo control system adapted for control of said primary and second pulley pressure in response to said system controller.

16. A hybrid electric vehicle, comprising:
a continuously variable transmission (CVT):
an internal combustion engine coupled to the CVT;
an electric motor coupled to the output of the internal combustion engine;
a system controller configured to operate said motor simultaneously with said engine and apply motor torque to said engine output to maintain engine power or torque output substantially along a predetermined operating line;
said system controller further configured to control rate of change of ratio of said continuously variable transmission;
wherein said system controller dynamically varies acceleration and deceleration of said vehicle by varying motor torque and rate of change of ratio of said continuously variable transmission;
programming associated with said system controller for carrying out the operations of controlling primary and secondary pulley pressures of the CVT to control the ratio rate and/or ratio and clamping pressure of the CVT based on an equilibrium ratio map of the CVT and the pressure relationship between the ratio rate of the CVT and the distance between the point corresponding to the current states of the CVT and the projection of this point onto said equilibrium ratio map; and
wherein a torque clipping algorithm is used to throttle back the torque to the primary pulley when the clamping pressure is insufficient to prevent slippage in the CVT.

17. A hybrid electric vehicle as recited in claim 7, further comprising a hydraulic servo control system adapted for control of said primary and second pulley pressure in response to said system controller.

18. A hybrid electric vehicle, comprising:
a continuously variable transmission (CVT);
said CVT having hydraulically operated primary and secondary pulleys with varying effective diameters;

a drive belt coupling the primary pulley to the secondary pulley;

wherein the pressure on said secondary pulley is raised instead of lowering the pressure on said primary pulley when said CVT is shifted toward low gear;

wherein a torque clipping algorithm is used to throttle back the torque to said primary pulley when the clamping pressure is insufficient to prevent slipping of said drive belt;

an internal combustion engine coupled to the CVT;

an electric motor coupled to the output of the internal combustion engine;

a system controller configured to operate said motor simultaneously with said engine and apply motor torque to said engine output to maintain engine power or torque output substantially along a predetermined operating line;

said system controller further configured to control rate of change of ratio of said continuously variable transmission;

wherein said system controller dynamically varies acceleration and deceleration of said vehicle by varying motor torque and rate of change of ratio of said continuously variable transmission;

a servo control system;

said servo control system configured to control clamping pressure and differential pressure between said primary and secondary pulleys in the CVT; and programming associated with said system controller for controlling said servo control system to achieve commanded clamping pressure and/or differential pressure between the primary and secondary pulleys based on a mapping of rate of change of ratio of said CVT to said clamping pressure and/or differential pressure between Pulleys.

* * * * *